(12) United States Patent
Zhang et al.

(10) Patent No.: US 12,041,331 B2
(45) Date of Patent: Jul. 16, 2024

(54) COMPOUND EYE CAMERA DEVICE AND COMPOUND EYE SYSTEM

(71) Applicant: SHANGHAI INSTITUTE OF MICROSYSTEM AND INFORMATION TECHNOLOGY, CHINESE ACADEMY OF SCIENCES, Shanghai (CN)

(72) Inventors: Xiaolin Zhang, Shanghai (CN); Yue Xu, Shanghai (CN); Yuzhang Gu, Shanghai (CN); Aike Guo, Shanghai (CN)

(73) Assignee: SHANGHAI INSTITUTE OF MICROSYSTEM AND INFORMATION TECHNOLOGY, CHINESE ACADEMY OF SCIENCES (CN)

( * ) Notice: Subject to any disclaimer, the term of this patent is extended or adjusted under 35 U.S.C. 154(b) by 213 days.

(21) Appl. No.: 17/777,403

(22) PCT Filed: Jan. 13, 2020

(86) PCT No.: PCT/CN2020/071734
§ 371 (c)(1),
(2) Date: May 17, 2022

(87) PCT Pub. No.: WO2021/103297
PCT Pub. Date: Jun. 3, 2021

(65) Prior Publication Data
US 2022/0407994 A1 Dec. 22, 2022

(30) Foreign Application Priority Data
Nov. 26, 2019 (CN) .......................... 201911173889.2

(51) Int. Cl.
*H04N 23/55* (2023.01)
*H04N 23/45* (2023.01)
*H04N 23/54* (2023.01)

(52) U.S. Cl.
CPC ............. *H04N 23/55* (2023.01); *H04N 23/45* (2023.01); *H04N 23/54* (2023.01)

(58) Field of Classification Search
CPC ........ H04N 23/55; H04N 23/45; H04N 23/54; H04N 2013/0081; H04N 13/232; G02B 3/0037
See application file for complete search history.

(56) References Cited

U.S. PATENT DOCUMENTS 8,576,489 B2 * 11/2013 Reininger .............. G02B 13/06
359/619
2003/0086013 A1 5/2003 Aratani
(Continued)

FOREIGN PATENT DOCUMENTS

CN 1655013 A 8/2005
CN 101548154 A 9/2009
(Continued)

OTHER PUBLICATIONS

International Search Report and Written Opinion with English Translation for PCT Application No. PCT/CN2020/071734, mailed Aug. 24, 2020, 9 pages.

*Primary Examiner* — Timothy J Henn
(74) *Attorney, Agent, or Firm* — Dickinson Wright PLLC

(57) ABSTRACT

The present application provides a compound eye camera device comprising a plurality of ommatidia arranged in a column or a row, and each of the ommatidia comprises an optical element and corresponding photosensitive units; each of the ommatidium columns corresponds to at least one ommatidium-column visual plane, the at least one ommatidium-column visual plane passing through the optical center of each ommatidium in the ommatidium column and a position near the center of at least one photosensitive unit of each ommatidium; each photosensitive unit intersects at least one ommatidium-column visual plane, and sight line of each photosensitive unit passes through the center of the photosensitive unit and the optical center of the ommatidium where the photosensitive unit is located; and a processor is configured to generate images based on information received by the photosensitive units, and to process the images to obtain information regarding the photographed object.

20 Claims, 9 Drawing Sheets

(56) References Cited

U.S. PATENT DOCUMENTS

| | | | | |
|---|---|---|---|---|
| 2009/0314929 A1* | 12/2009 | Lee | ................... | G02B 6/02033 |
| | | | | 250/227.28 |
| 2016/0041311 A1* | 2/2016 | Kogo | ............... | H01L 27/14627 |
| | | | | 359/741 |
| 2017/0195534 A1* | 7/2017 | Jeong | ............... | H01L 27/14687 |

FOREIGN PATENT DOCUMENTS

| | | | | |
|---|---|---|---|---|
| CN | 101753849 | A | 6/2010 | |
| CN | 104597599 | A | 5/2015 | |
| CN | 106537890 | A | 3/2017 | |
| CN | 107613177 | A | 1/2018 | |
| CN | 107809610 | A | 3/2018 | |
| CN | 109360238 | A | 2/2019 | |
| CN | 109934854 | A | 6/2019 | |
| EP | 2306230 | A1 * | 4/2011 | ........... G02B 13/001 |
| WO | 2015133226 | A1 | 9/2015 | |
| WO | 2015182488 | A1 | 12/2015 | |

\* cited by examiner

COMPOUND EYE CAMERA DEVICE AND COMPOUND EYE SYSTEM

CROSS-REFERENCE TO RELATED APPLICATIONS

This application is the U.S. National Phase of PCT/CN2020/071734, filed on Jan. 13, 2020, which claims priority to CN201911173889.2, filed on Dec. 26, 2019, the contents of which are all hereby incorporated by reference.

FIELD OF THE INVENTION

The present application relates to the field of optical imaging, in particular for a compound eye camera device and a compound eye system.

DESCRIPTION OF THE RELATED ART

In the animal kingdom, a compound eye refers to a visual organ composed of numerous single eyes, which mainly appears in arthropods such as insects and crustaceans. Taking compound eye insects as an example, each single eye in the compound eye has a lens (similar to a microlens) and photoreceptor cells corresponding to the arrangement of the lens. These photoreceptor cells will transmit photoreceptor information to the brain nervous system of the insects, so as to effectively calculate the orientation and distance between themselves and the observed object, namely, to realize stereoscopic vision, which is beneficial for compound-eyed insects to make quick judgment and reaction.

Artificial compound eye technology is a technology inspired by the unique compound eye structure of animals. Compared with traditional optical systems, artificial compound eyes have the advantages of small size, light weight, large view and high sensitivity, etc., so they have a wide application prospect. Researches on artificial compound eye technology involve the fields of radar systems, missile guidance devices, micro aircraft, systems for ship searching and tracking, night vision equipment, micro compound eye cameras, robots, etc. For example, artificial compound eye technology can be used in the vision systems of intelligent robots, which can realize recognition, tracking, speed measurement, etc. of a target by processing the external information collected by artificial compound eye detectors.

However, an artificial compound eye disclosed at present usually uses multiple cameras or an array of cameras, obtains symmetrical images by means of different cameras and then performs stereoscopic matching by using algorithms, so as to obtain stereoscopic vision. The principle of it is different from that of a compound eye of an animal, and cannot be regarded as a compound eye in the true sense, which is not only in a large size, but also in a high computational cost.

SUMMARY OF THE INVENTION

The present application provides a compound eye camera device adopting bionic structure design, which aims to acquire accurate three-dimensional space information and realize the function of better stereoscopic vision. The present application further provides a compound eye system including the compound eye camera device.

On one hand, the technical solution of the present application is to provide a compound eye camera device which comprises ommatidium columns and a processor; each of the ommatidium columns comprises a plurality of ommatidia that do not interfere with each other optically and are arranged in a column, and each of the ommatidia comprises an optical element and at least one photosensitive unit arranged near a focal plane of the optical element; wherein the optical element is used to face a photographed object and receive incident light beams within the view, wherein each of the ommatidium columns corresponds to at least one ommatidium-column visual plane, the at least one ommatidium-column visual plane passing through the optical center of each ommatidium in the ommatidium column and a position near the center of at least one photosensitive unit of each ommatidium; each photosensitive unit intersects at least one ommatidium-column visual plane, and sight line of each photosensitive unit passes through the center of the photosensitive unit and the optical center of the ommatidium where the photosensitive unit is located; and the processor is configured to generate images based on information received by the photosensitive units in the ommatidia, and to process the images to obtain information about the photographed object.

Optionally, in the ommatidium columns, each ommatidium comprises one photosensitive unit, and the sight lines of various photosensitive units do not intersect each other within the view of the ommatidium columns.

Optionally, in the ommatidium columns, each ommatidium comprises one, two or more photosensitive units, and the sight line of at least one photosensitive unit intersects the sight lines of other photosensitive units within the view of the ommatidium columns.

Optionally, the compound eye camera device comprises at least two ommatidium columns, and an angle is formed between the ommatidium-column visual planes belonging to different ommatidium columns, and each ommatidium belongs to one, two or more ommatidium columns.

Optionally, a plurality of the ommatidium columns adjoin in sequence to form an ommatidium array, and the optical elements of various ommatidia in the ommatidium array are arranged in a honeycombed curved surface or in a two-dimensional plane.

Optionally, the processor further comprises a unit for imaging each single compound eye image, which is configured to process the information of all or part of the photosensitive units with non-intersecting sight lines and compose an image after obtaining the information of the photosensitive units of various ommatidia, so as to obtain at least one single compound eye image.

Optionally, the processor further comprises a unit for matching compound eye images, a parallax calculating unit and a position analyzing unit; the unit for matching compound eye images is configured to match at least two single-compound eye images which belong to the same ommatidium-column visual plane and in which the sight lines of at least part of the photosensitive units intersect each other, so as to obtain a group of matched compound eye images; wherein each of the single-compound eye images in the matched compound eye images comprises a pixel point formed in the single-compound eye images according to the information of the photographed object at the intersection of the sight lines; the parallax calculating unit is configured to acquire parallax information between the pixel points in the matched compound eye images, which is generated according to the information of the photographed object at the intersection of the sight lines; the position analyzing unit is configured to acquire the information of the photographed object at the intersection of the sight lines based on information of the ommatidium columns and the parallax information.

Optionally, the single compound eye images in the matched compound eye images are all acquired according to the information of the photosensitive units in various ommatidia obtained at the same time or within the same time period.

Optionally, the position analyzing unit is further configured to acquire motion information of the photographed object in the view according to the information of the photographed object at multiple moments or within the same time period.

Optionally, the compound eye camera device further comprises a storage unit and a display unit; the storage unit is configured to store the single-compound eye images, the matched compound eye images and the information of the photographed object; the display unit is configured to output and display the single-compound eye images, or the display unit is configured to output and display at least one of texture and color, three-dimensional position and pose attitude, and shape of the photographed object based on the information of the photographed object acquired by the position analyzing unit.

Optionally, the same ommatidium column comprises at least one sub-ommatidium column, each of the sub-ommatidium columns comprises a plurality of ommatidia adjacent to each other in sequence, and a set spacing is provided between two adjacent sub-ommatidium columns.

Optionally, an ommatidium is provided between two adjacent sub-ommatidium columns, which does not belong to the same ommatidium column as the sub-ommatidium columns.

Optionally, a line connecting the optical centers of the ommatidia in each sub-ommatidium column is a straight line segment or an arc line segment.

Optionally, the sight line of each photosensitive unit has a diffusion angle associated with the photosensitive area of the photosensitive unit, and the diffusion angle is less than or equal to angle between the sight lines of two adjacent photosensitive units in the same ommatidium-column visual plane.

Optionally, when the line connecting the optical centers of each ommatidium in the sub-ommatidium column is an arc line segment, the diffusion angle is also less than or equal to angle between the axes of two adjacent ommatidia located in the arc line segment.

Optionally, in the ommatidium columns, the optical elements in various ommatidia are all microlenses, the diameters and the focal lengths of which are the same or not all the same.

Optionally, in the ommatidium columns, the cross section of the microlens of each of the ommatidia perpendicular to the ommatidium-column visual plane via circle, an ellipses or a polygon.

Optionally, in the same ommatidium column, the number of the photosensitive units in each of the ommatidia is the same.

Optionally, the information received by the photosensitive unit comprises intensity information and color information corresponding to the incident light beam on the sight line.

Optionally, various ommatidia in the ommatidium columns are integrated on the same semiconductor substrate, and various ommatidia are separated from each other by a medium.

On the other hand, the present application also provides a compound eye system, which comprises a plurality of the above compound eye camera devices arranged at a set spacing.

Optionally, a plurality of the compound eye camera devices are symmetrical relative to a center line.

Optionally, the compound eye system also comprises a control device for controlling the poses of the ommatidium columns in the compound eye camera device, which is connected with the processor of each of the compound eye camera devices.

The compound eye camera device provided by the present application comprises at least one ommatidium column and a processor; the ommatidium column comprises a plurality of ommatidia that do not interfere with each other optically and are arranged in a column, and each of the ommatidia all comprises an optical element and at least two photosensitive units arranged near the focal plane of the optical element. The compound eye camera device is similar to the compound eye function of compound eye animals. Specifically, each ommatidium in the ommatidium columns can have the function of a single eye in the compound eye of animals. Each of the ommatidium columns corresponds to at least one ommatidium-column visual plane, the at least one ommatidium-column visual plane passing through optical centers of each ommatidium in the ommatidium columns and positions near the centers of at least one photosensitive unit of each ommatidium. Each of the photosensitive unit intersects at least one ommatidium-column visual plane, and sight line of each photosensitive unit passes through the center of the photosensitive unit and the optical center of the ommatidium where it is located. The sight lines of different photosensitive units on the same ommatidium-column visual plane can intersect or not. Correspondingly, images in the view can be acquired by means of the photosensitive units with high definition. The compound eye camera device provided by the present application has a bionic design very close to the compound eye of animals, which is conducive to obtaining accurate three-dimensional space information and achieving better stereoscopic vision.

The compound eye system provided by the present application comprises a plurality of the above compound eye camera devices arranged at a set spacing. The above compound eye camera device can be used for two-dimensional plane or three-dimensional detection from different directions, which is conducive to obtaining accurate two-dimensional and three-dimensional space information and achieving better stereoscopic vision. It can be used in the fields of robot vision, aircraft, etc., having wide application prospects.

BRIEF DESCRIPTION OF THE DRAWINGS

These and other features and advantages of this application will become more apparent to those skilled in the art from the detailed description of preferred embodiment. The drawings that accompany the description are described below.

Wherein.

FIG. 2(*b*) is a schematic view of the imaging of an ommatidium in FIG. 2(*a*).

FIG. 2(*c*) is a schematic view of an optical center cone and a pixel surface photosensitive light beam corresponding to a photosensitive unit in FIG. 2(*a*).

LIST OF REFERENCE NUMBERS

Figure 1:
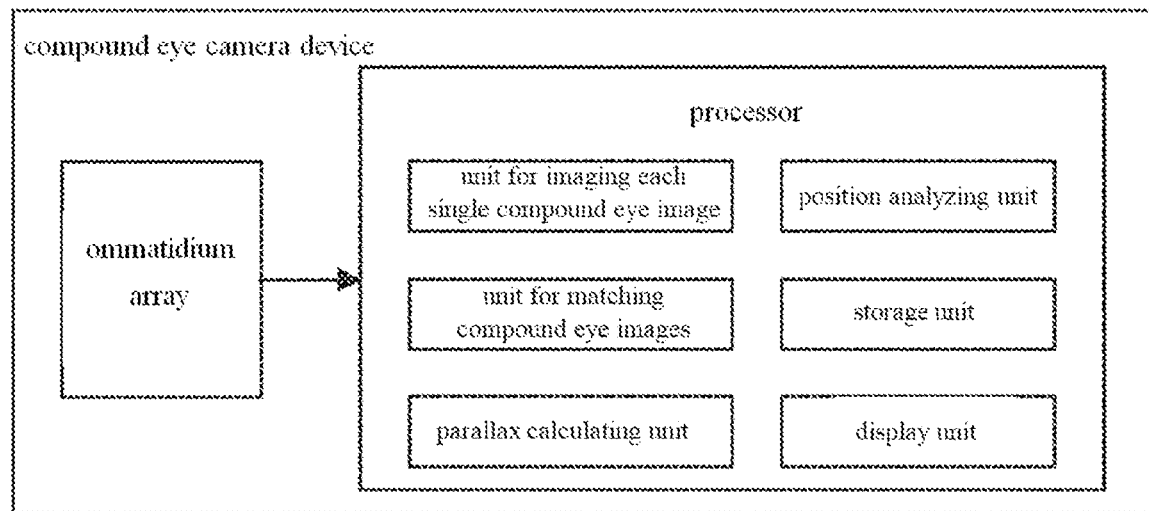
FIG. 1 is a schematic view of the structure of the compound eye camera device according to an embodiment of the present application.

100, 200, 300, 400 ommatidium array
10, 20, 30, 40 ommatidium
21, 31 photosensitive unit
10 focal plane

DESCRIPTION OF THE PREFERRED EMBODIMENTS

At present, there have been many researches and achievements on artificial compound eye technology, but the artificial compound eye technology that obtains the information of stereoscopic vision by means of compound eyes directly, like compound eye insects, has not yet appeared. The main reason is the lack of a highly bionic compound eye structure that is closer to compound eyes of animals and the development of computer technology for achieving the function of stereoscopic vision based on the highly bionic compound eye structure. Obviously, it is significant for the development of artificial compound eyes to realize the function of stereoscopic vision by means of the highly bionic compound eye structure. The compound eye camera device using related technologies is conducive to obtaining accurate three-dimensional space information, and better function of stereoscopic vision can be realized compared with the method of taking images separately by multiple ordinary cameras and then processing them.

Based on the above purposes, the present application provides a compound eye camera device and a compound eye system. Wherein, the compound eye camera device provided by the present application comprises ommatidium columns and a processor; each of the ommatidium columns comprises a plurality of ommatidia that do not interfere with each other optically and are arranged in a column, and each of the ommatidia comprises an optical element and at least one photosensitive unit arranged near the focal plane of the optical element respectively; the optical element is used to face a photographed object and receive incident light beams within the view, wherein each of the ommatidium columns corresponds to at least one ommatidium-column visual plane, the at least one ommatidium-column visual plane passing through the optical center of each ommatidium in the ommatidium column and a position near the center of at least one photosensitive unit of each ommatidium; each photosensitive unit intersects at least one ommatidium-column visual plane, and sight line of each photosensitive unit passes through the center of the photosensitive unit and the optical center of the ommatidium where the photosensitive unit is located; and the processor is configured to generate images based on information received by the photosensitive units in the ommatidia, and to process the images to obtain information about the photographed object. The compound eye system provided by the present application comprises the compound eye camera device.

The compound eye camera device provided by the present application is similar to a compound eye of a compound eye animal in the sense of bionics, and the compound eye system is similar to the visual system of a compound eye animal. In the compound eye camera device, a sufficient quantity of the ommatidia in a ommatidium column can be provided according to requirement, and "column" herein can also be replaced by "row". The optical element of each ommatidium in the ommatidium column is used to receive light, so it is arranged on the same side of the ommatidium column for facing the photographed object when taking images. Along the direction of the sight line of a photosensitive unit, an incident light is sensed by passing through the optical element and reaching the corresponding photosensitive unit, so as to be converted into image information. The photographed object "seen" by the compound eye camera device can be any object or creature in space, and the photographed object can be regarded as a combination of spatial points with certain texture and color, three-dimensional position and attitude, and shape. When taking an image, lights are incident to the ommatidia in the ommatidium column, and by using the photosensitive units in the ommatidia, the image of the photographed object in the related sight line can be generated according to the detected light intensity, color, etc. The compound eye camera device has a bionic design very close to the compound eye of an animal, which is conducive to obtaining accurate two-dimensional or three-dimensional space information and achieving better stereoscopic vision.

The compound eye camera device and the compound eye system of the present application will be further described in detail below in combination with the drawings and several specific embodiments. The advantages and features of the present application will become clearer according to the following description. It should be understood that the various embodiments are merely exemplary embodiments for manufacturing and applying of the present application, and do not limit the scope of manufacturing and applying of the present application. In addition, describing several embodiments separately is only to explain the connotation of the present application more clearly, so that the technical features in each embodiment do not belong to the unique features of this embodiment, and all the features of various embodiments can also be the features of an overall embodiment. In some implementations, the technical features in the following embodiments can also be related to each other and inspired by each other, so as to form new embodiments.

Embodiment One

This embodiment describes the main structure and function of the compound eye camera device of the present application.

FIG. 1 is a schematic view of the structure of the compound eye camera device according to an embodiment of the present application. Referring to FIG. 1, in one embodiment, the compound eye camera device comprises the above-mentioned ommatidium columns and processor.

Specifically, the compound eye camera device may comprise one, two or more ommatidium columns, and multiple ommatidium columns may constitute an ommatidium array. An angle is formed between the ommatidium-column visual planes belonging to different ommatidium columns, and each ommatidium belongs to one, two or more ommatidium columns. As for the same ommatidium column, each ommatidium may comprise one, two or more (including two) photosensitive units, and the sight line of each photosensitive unit is in the same plane, so that two lines that intersect or do not intersect can be formed. Whether to intersect or not herein refers to whether the sight lines from the front side of the ommatidium column, namely, from one side in which the optical elements and the photosensitive units receive incident light intersect at a point or not, that is, intersect in the view of the ommatidium column.

The processor is configured to generate images based on information received by the photosensitive units in the ommatidia, and to process the images to obtain information about the photographed object. Further, in order to process the information of the photosensitive units and obtain information about the photographed object, the processor optionally comprises the following components or modules: a unit for imaging each single compound eye image, a unit for matching compound eye images, a parallax calculating unit and a position analyzing unit. The specific functions are described as follows.

The unit for imaging each single compound eye image is configured to process the information of all or part of the photosensitive units with non-intersecting sight lines and compose images after obtaining the information of the photosensitive units from various ommatidia in the ommatidium column, so as to obtain at least one single compound eye image. Since each single compound eye image only obtains the information of the photographed object in a different direction of the sight lines according to the separate photosensitive units, it does not have an effect of stereoscopic vision. But there is no focusing problem and it is not necessary to provide a special lens to focus compared with ordinary 2D cameras, so that plane vision with relatively good clarity can be realized.

In the compound eye camera device in this embodiment, an ommatidium column is a structure composed of multiple ommatidia. Therefore, when the sight lines of various photosensitive units intersect (herein referring to intersecting in the view of the ommatidium column, excluding the case that the sight lines of the photosensitive units of the same ommatidium intersect at the optical center), parallax is observed from the images at the intersection point obtained by the two photosensitive units with intersecting sight lines, due to the difference between the photosensitive units' distances to the photographed object at the intersection. The parallax can be obtained by processing the two single compound eye images where the two photosensitive units with intersecting sight lines are located. The optional methods for calculating the parallax include block matching, deep neural network learning and feature matching, etc. In addition, a public method for calculating the parallax of a binocular vision sensor can be used.

In this embodiment, the information of the photosensitive units with intersecting sight lines are used to obtain the position of the intersection points, so that the compound eye camera device can generate stereoscopic vision.

Specifically, in addition to the unit for imaging each single compound eye image, the processor also comprises a unit for matching compound eye images, a parallax calculating unit and a position analyzing unit. The unit for matching compound eye images is configured to match the single compound eye images which belong to the same ommatidium-column visual plane and in which the sight lines of at least part of the photosensitive units intersect each other, so as to obtain a group of matched compound eye images. Each of the single compound eye images in the matched compound eye images comprises pixel points formed in the images corresponding to the information of the photographed object at the intersection of the sight lines. The parallax calculating unit is configured to acquire parallax information between the pixel points in the matched compound eye images, which is generated according to the information of the photographed object at the intersection of the sight lines. The position analyzing unit is configured to acquire the information of the photographed object at the intersection of the sight lines based on information of the ommatidium column and the parallax information.

In addition, referring to FIG. 1, the compound eye camera device further comprises a storage unit and a display unit. The storage unit is configured to store the single compound eye images, the matched compound eye images and the information of the photographed object. The storage unit can store information by means of RAMs, ROMs, hard disks, magnetic disks, optical disks, registers in a CPU and other media.

The display unit is configured to output and display the single compound eye images, or output and display at least one of texture and color, three-dimensional position and pose attitude, and shape of the photographed object based on the information of the photographed object acquired by the position analyzing unit. The display unit may comprise a displayer, and the displayer can be a plane image displayer or a three-dimensional image displayer.

Each component of the above mentioned processor (including the unit for imaging each single compound eye image, the unit for matching compound eye images, the parallax calculating unit and the position analyzing unit, etc.) can be combined in one module, or any one of the devices can be divided into multiple modules, or at least part of the functions of one or more of these devices and at least part of the functions of other devices can be combined and be implemented in one module. According to the embodiment of the present application, at least one of the unit for imaging each single compound eye image, the unit for matching compound eye images, the parallax calculating unit and the position analyzing unit can be implemented at least partially as a hardware circuit, such as a FPGA, a PLA, a system on chip, a system on substrate, a system on package, an ASIC, be implemented in any other suitable way of integrating or packaging circuits in hardware or firmware, or be implemented in an appropriate combination of software, hardware and firmware. Alternatively, at least one of the signal processing unit, the image processing unit, the position analyzing unit, the storage unit, and the output unit can be implemented at least partially as a computer program module. When the program is executed by a computer, the function of the corresponding module can be performed. The compound eye camera device can be made by using the manufacturing process of integrated circuits. In one embodiment, the compound eye camera device is a chip-level device. The ommatidia in various ommatidium columns of the compound eye camera device may be all integrated on the same semiconductor substrate. The semiconductor substrate can be a Si substrate, a Ge substrate, etc., and can also be a ceramic substrate, a quartz or glass substrate, etc. made of alumina or other materials. In order to avoid the interference of internal light between adjacent ommatidia, various ommatidia are separated from each other by a medium, and the medium is preferably made of a light-blocking material.

It can be seen from the above description that the compound eye camera device according to the embodiment of the present application can be used to realize plane vision (or 2D vision) and stereoscopic vision (or 3D vision).

Embodiment Two

This embodiment mainly describes the ommatidium columns of the compound eye camera device of the present application.

Figure 2A:
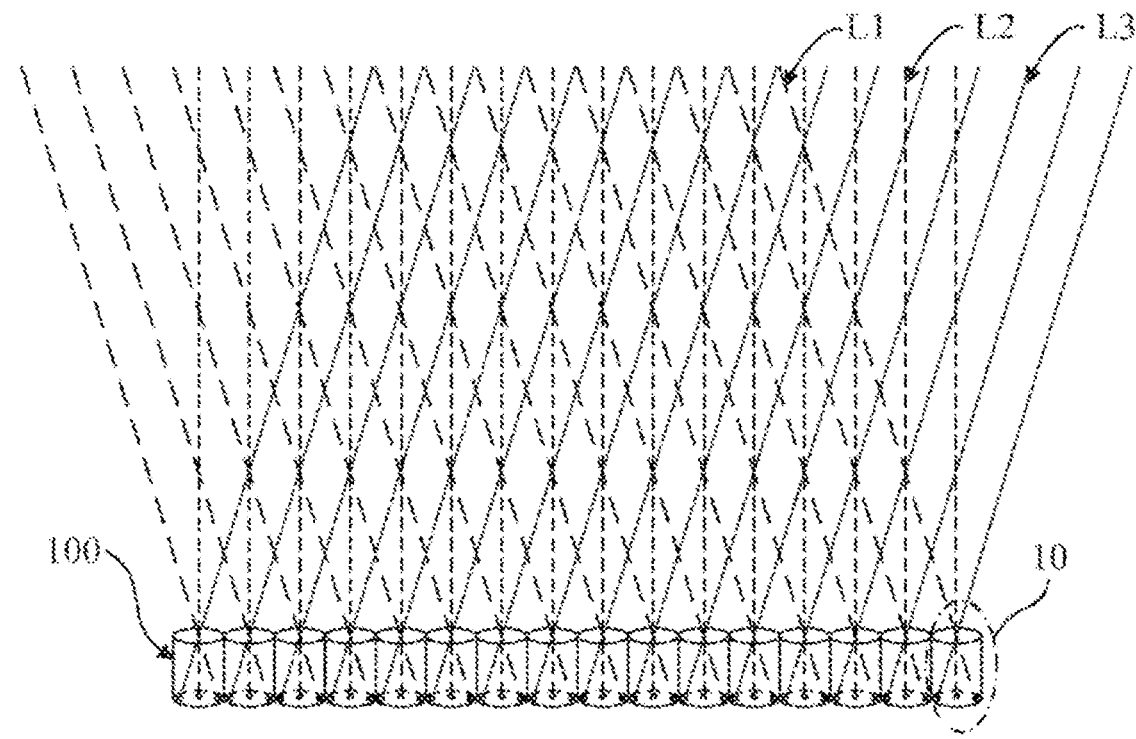
FIG. 2(*a*) is a schematic view of the imaging of an ommatidium column according an embodiment of the present application.
Figure 2B:
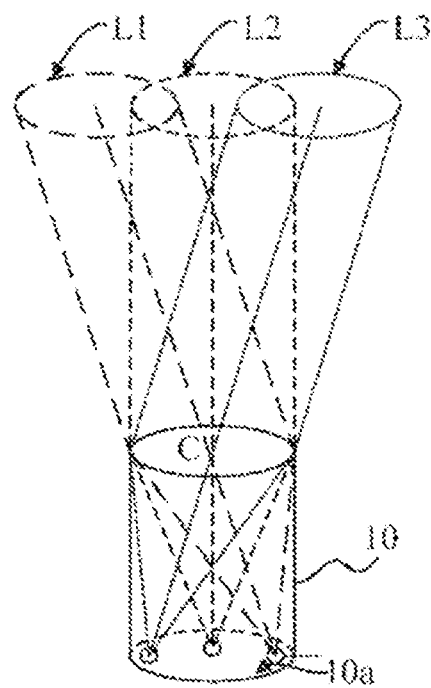
Figure 2C:
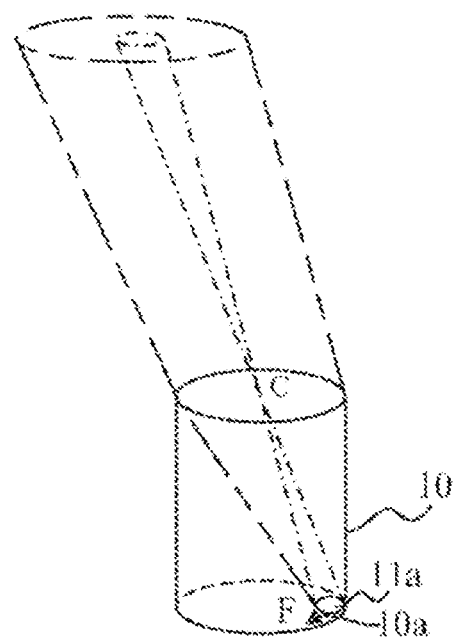

FIG. 2(a) is a schematic view of the imaging of an ommatidium column according an embodiment of the present application. FIG. 2(b) is a schematic view of an ommatidium in FIG. 2(a). FIG. 2(c) is a schematic view of an optical center cone and a pixel surface photosensitive light beam corresponding to a photosensitive unit in FIG. 2(a).

Referring to FIG. 2(a) and FIG. 2(b), the incident light beams L1, L2 and L3 are incident on the ommatidium column 100, and projected into each ommatidium 10 along the direction of sight lines of the photosensitive units in each ommatidium. After the parallel light beams pass through the optical center C of the ommatidium 10 (more specifically, the optical center of the optical element in the ommatidium), they are focused on the focal plane 10a, that is, any one focal point corresponds to the convergence point at the focal plane 10a of the parallel light beams in the direction of the line connecting this focal point and the optical center C. Depending on the different choices of the specific structure of the optical element in the ommatidium 10, the focal plane 10a thereof can be a plane, or have certain curvature. FIG. 2(a) schematically shows three points on the focal plane 10a of each ommatidium 10, and the straight lines determined by connecting the three points with the optical center C are light axes of the light beams in the corresponding directions of the incident lights. As shown in FIG. 2(b), the three points on the focal plane 10a of the single ommatidium 10 in FIG. 2(a) correspond to the incident light beams in different directions. Referring to FIG. 2(c), the information of the intensity (or brightness, color) of the incident light beam can be obtained by arranging a photosensitive element near the focal plane 10a of the optical element of the ommatidium 10, and by arranging the photosensitive surface 11a of the pixel in the photosensitive element on the focal plane 10a of the corresponding optical element. The cone formed by the photosensitive surface 11a and the optical center C of the corresponding optical element and extending through the opposite direction from the optical center C is referred as an optical center cone (indicated by dotted horizontal lines in FIG. 1(c)). The optical center cone represents the cone formed by the optical axes corresponding to all points in the scope of corresponding photosensitive surface passing through the optical center. The incident light beam received by the photosensitive element in the scope of the photosensitive surface 11a is a table-type column which is thickened from the corresponding optical center cone to the scope of the light-transmitting area of the optical element, and the table-type light column can be referred as a pixel surface photosensitive light beam corresponding to the photosensitive surface (indicated by long and short horizontal lines in FIG. 1(c)).

The compound eye camera device of the present application makes use of the above optical principles. In one embodiment, the compound eye camera device comprises a plurality of ommatidia, each of which is arranged in a column (or row) together with at least two other ommatidia and the column is referred as a ommatidium column. Each ommatidium comprises an optical element and at least one photosensitive unit arranged near the focal plane of the optical element, and the optical element is used to face the photographed object and to receive the incident light beams. Each ommatidium does not interfere with each other optically, so the light entering each ommatidium can only be sensed on the focal plane of the ommatidium.

The incident light beams are incident and then converge on the focal plane via the optical element of the ommatidium 10 in the ommatidium column. Each ommatidium 10 of the ommatidium array 100 comprises an optical element and a photosensitive element arranged on one side of the focal plane of the optical element. The photosensitive element can comprise one, two or more photosensitive units (or referred as photosensitive pixels). Referring to FIG. 2(a), three photosensitive units can be respectively arranged at three convergence points on the focal plane 10a of each ommatidium, and the optical axis determined by the center of a photosensitive unit and the optical center C is the sight line of the photosensitive unit. In the case where multiple photosensitive units are arranged in the same ommatidium, the incident light beams in different directions can be sensed by different photosensitive units arranged near the focal plane after being converged by the optical element. Thus, the directions of the incident light beams are related to the positions of the photosensitive units. The positions of different photosensitive units in the same ommatidium are set to be corresponding to the incident directions of different light beams, and the light beams incident on the optical element from different directions are detected by using different photosensitive units, so that the light information in the direction of sight lines of the photosensitive units can be obtained according to the signal detected by the photosensitive units. In some cases (as shown in FIG. 2(a)), the sight line of the photosensitive unit will intersect with the sight lines of part of the photosensitive units in other ommatidia in the view of the ommatidium column 100, so parallax is observed from the images generated by the photosensitive units with the intersecting sight lines, and the parallax can be acquired by calculation.

Each of the ommatidium columns corresponds to at least one ommatidium-column visual plane (such as the plane parallel to the paper in FIG. 2(a)). The at least one ommatidium-column visual plane passes through the optical center of each ommatidium in the ommatidium column and a position near the center of at least one photosensitive unit of each ommatidium. Each of the photosensitive unit intersects at least one ommatidium-column visual plane, and the sight line of the photosensitive unit is in the corresponding ommatidium-column visual plane. As for different photosensitive units in the same ommatidium, they can belong to the same ommatidium-column visual plane, or belong to different ommatidium-column visual planes. The sight lines of the photosensitive units of various ommatidia belonging to the same ommatidium-column visual plane are all in the ommatidium-column visual plane.

The compound eye camera device can comprise one or more ommatidium columns above, and more than two ommatidium columns can form an ommatidium array according to a certain arrangement. As for different ommatidium columns, they do not have a common ommatidium-column visual plane, that is, an angle (herein referring to an angle greater than 0) will be formed between the respective ommatidium-column visual planes. But as for the ommatidia in the ommatidium columns, each ommatidium can belong to one, two or more ommatidium columns, according to the distribution of the ommatidium-column visual planes passing through its optical center and photosensitive units.

As for each ommatidium in the ommatidium columns, it can usually be set in the form of a compact arrangement as shown in FIG. 2, that is, a plurality of ommatidia are arranged adjacently in sequence, but it is not limited to this. As for the ommatidium columns that satisfy the above conditions, a spacing can also be provided between various ommatidia. In addition, the ommatidia of another ommatidium column can be provided at the spacing position. Moreover, the same ommatidium column can also comprise at least one sub-ommatidium column, each of the sub-ommatidium columns comprises a plurality of ommatidia adjacent to each other in sequence, and a set spacing is maintained between the adjacent sub-ommatidium columns. As for the same sub-ommatidium column, the line connecting the optical centers of various ommatidia can be a straight line segment or an arc line segment. In the preferred solution, the line connecting the optical centers of various ommatidia is an arc line segment in order to expand the visual angle.

Figure 3:
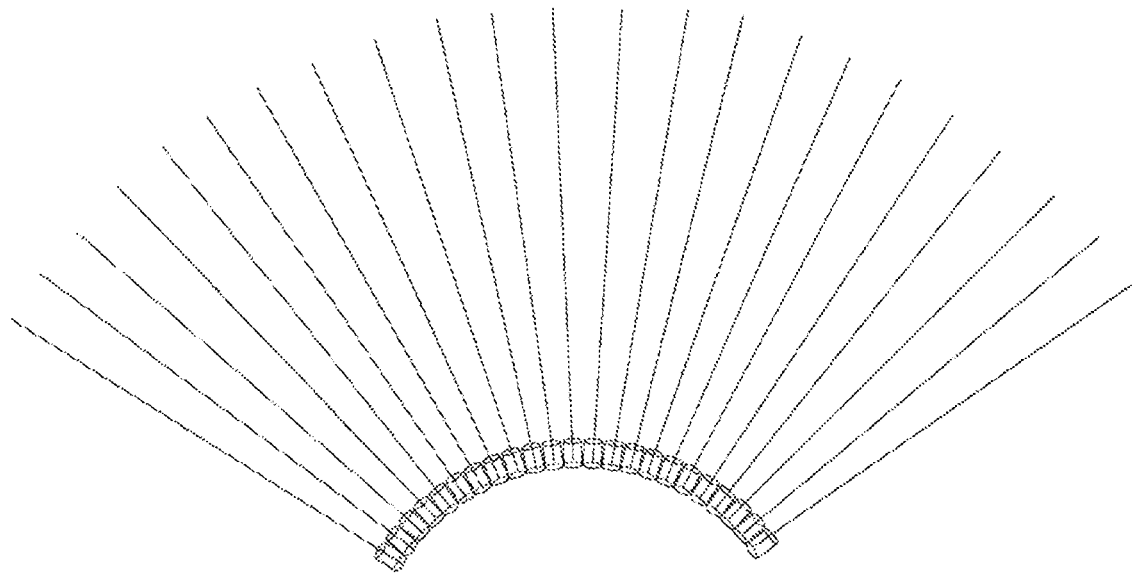
FIG. 3 is a schematic view of the ommatidium column according an embodiment of the present application.

FIG. 3 is a schematic view of the ommatidium column according an embodiment of the present application. Referring to FIG. 3, in one embodiment, each ommatidium in the ommatidium column comprises one photosensitive unit, and the sight lines of various photosensitive units do not intersect with each other in the view of the ommatidium column. A single compound eye image can be obtained according to the information of each photosensitive unit, after the information of the various photosensitive units of the ommatidium column is obtained. The single compound eye image is a two-dimensional image of the photographed object in the view of the ommatidium column, that is, the ommatidium column of this structure can be used for two-dimensional vision, such as for 2D cameras. Although there is no effect of stereoscopic vision, it can achieve the effect of a common camera with a lens. Compared with ordinary 2D cameras, the structure is more convenient, because it has a small lens and does not need a special camera lens. Moreover, this type of camera has no focusing problems, that is to say, objects at any distance can be seen clearly, and merely the resolution of distant objects will decrease as the distance increases. In another embodiment, a plurality of ommatidium columns as shown in FIG. 3 are arranged in a spherical surface, and a corresponding single compound eye image can be obtained by using the image information captured by various photosensitive units at the same time or within the same time period, so the ommatidium columns can be used as a 2D camera.

Figure 4:
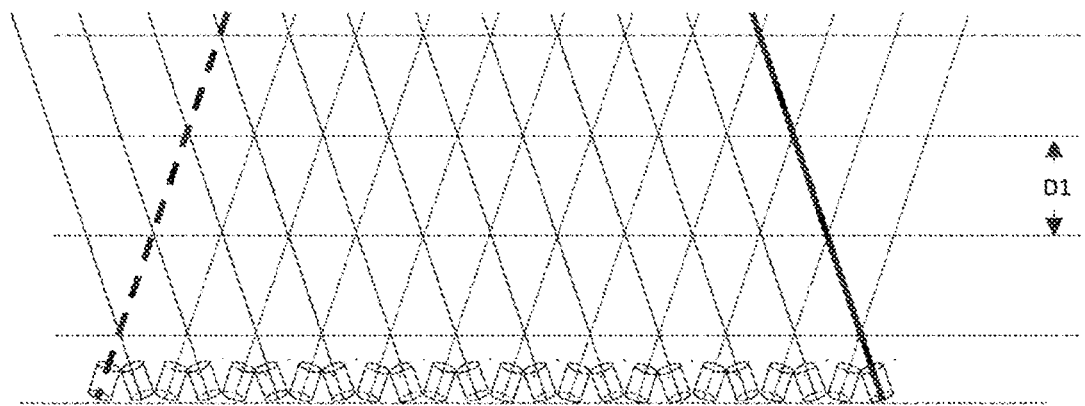
FIG. 4 is a schematic view of the ommatidium column according an embodiment of the present application.
Figure 5:
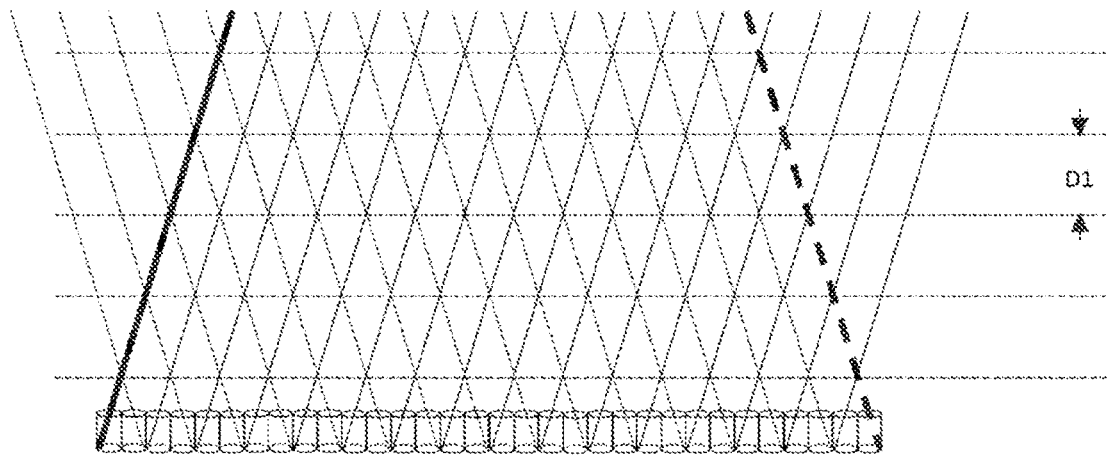
FIG. 5 is a schematic view of the ommatidium column according an embodiment of the present application

FIG. 4 is a schematic view of the ommatidium column according an embodiment of the present application. FIG. 5 is a schematic view of the ommatidium column according an embodiment of the present application. Referring to FIG. 4 and FIG. 5, in some embodiments, each ommatidium in the ommatidium column comprises one photosensitive unit, but compared with FIG. 3, the sight lines of various photosensitive units intersect in the view of the ommatidium column in FIG. 4 and FIG. 5 by designing the mutual positions between the ommatidia and the positions of the photosensitive units. Therefore, a group of matched compound eye images can be formed according to more than two single compound eye images, so as to realize the effect of stereoscopic vision. In FIGS. 4 and 5, the line connecting the optical centers of various ommatidia in the ommatidium column is a straight line segment. As the distance from the ommatidium column increases, the measurable distance accuracy of the ommatidium column in the depth of view remains almost unchanged.

Figure 6:
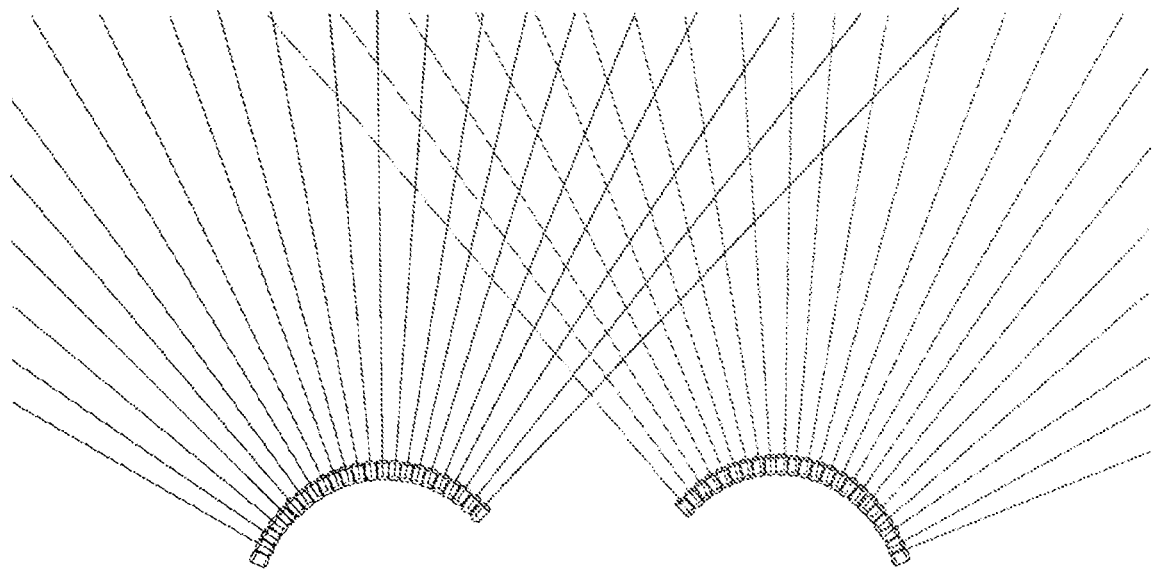
FIG. 6 is a schematic view of the ommatidium column according an embodiment of the present application.

FIG. 6 is a schematic view of the ommatidium column according an embodiment of the present application. Referring to FIG. 6, in one embodiment, an ommatidium column comprises two sub-ommatidium columns, each of which comprises a plurality of ommatidia adjacent to each other in sequence. And in each sub-ommatidium column, each ommatidium only comprises one photosensitive unit, and the sight lines of the photosensitive units do not intersect with each other. Certain spacing is maintained between the two adjacent sub-ommatidium columns. In this embodiment, the sight lines of the photosensitive units in the ommatidium column intersect at least partially, so the ommatidium column formed by the two sub-ommatidium columns or more sub-ommatidium columns can also be used to realize stereoscopic vision.

Figure 7:
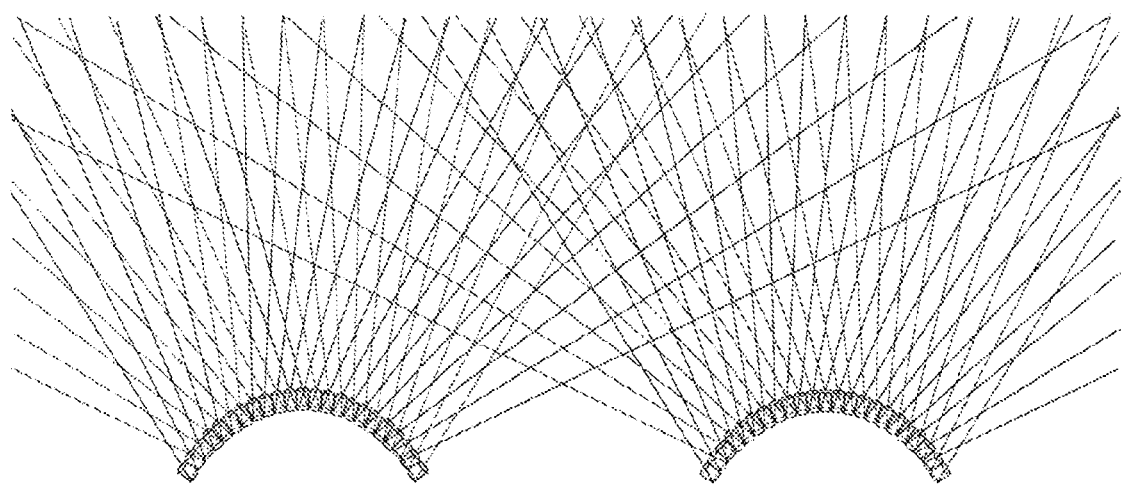
FIG. 7 is a schematic view of the ommatidium column according an embodiment of the present application.

FIG. 7 is a schematic view of the ommatidium column according an embodiment of the present application. Referring to FIG. 7, in one embodiment, an ommatidium column comprises two sub-ommatidium columns, each of the sub-ommatidium columns comprises a plurality of ommatidia adjacent to each other in sequence, and each ommatidium comprises more than one photosensitive unit. For the ommatidium column, the sight lines of the photosensitive units in each sub-ommatidium column intersect in the view. In addition, the sight lines of the photosensitive units in different sub-ommatidium columns also intersect in the view. Compared with the ommatidium columns shown in FIG. 6, the accuracy of the stereoscopic vision generated by the intersection of the sight lines of the two sub-ommatidium columns is higher. Remeasuring the stereoscopic vision calculated by each sub-ommatidium column via the combination of the two sub-ommatidium columns not only has a low error rate of a single sub-ommatidium column, but also has a greatly improved accuracy.

It should be noted that each of the above mentioned FIGS. 3 to 7 only shows the arrangement of the ommatidium column on one ommatidium-column visual plane, but more than one ommatidium column can also be provided at the position of each ommatidium column in each embodiment. That is, the optical centers of various ommatidia can be arranged in a plane or a curved surface, so that the two-dimensional vision and three-dimensional vision mentioned above can still be realized. Each ommatidium column can be used as a compound eye of the compound eye camera device, or each sub-ommatidium column can be used as a compound eye of the compound eye camera device to realize two-dimensional and/or three-dimensional vision.

In addition, considering the size of each photosensitive unit, what can be detected by the photosensitive unit is the image signal of the pixel surface photosensitive light beam corresponding to the photosensitive area of the photosensitive unit. In the embodiment, the incident light beam detected by each photosensitive unit has a diffusion angle associated with the photosensitive area of the photosensitive unit. In order to enable the incident light beam detected by each photosensitive unit and the incident light beam detected by the adjacent photosensitive unit to be clearly distinguished, and to improve the resolution ratio of the compound eye camera device, the diffusion angle is preferably less than or equal to the angle between the sight lines of two adjacent photosensitive units in the same ommatidium-column visual plane. When the sub-ommatidium column in the shape of an arc line segment is included, the diffusion angle is also less than or equal to the angle between the axes of two adjacent ommatidia located in the arc line segment. The axis of the ommatidium herein refers to the straight line which is perpendicular to the incident plane of the optical element of the ommatidium and passes through the optical center.

It can be seen from the above description that the arrangement of the ommatidia and the number of photosensitive units in the ommatidium column in the embodiment of the present application can be configured as desired. And the compound eye camera device including the ommatidium column is enabled to realize two-dimensional plane and stereoscopic vision according to whether the sight lines of the photosensitive units intersect or not.

Embodiment Three

This embodiment mainly describes the specific structure of the compound eye camera device according to the embodiment of the present application.

In the ommatidium column in the compound eye camera device of the present application, the optical element in each ommatidium can be a microlens, and the microlens herein is a convex lens, the focal plane of which is located on the opposite side from the photographed object. The ommatidium mentioned below is described to have a microlens as the optical element. However, the present application is not limited to this. In another embodiment, the optical element of at least one ommatidium can also be a composite imaging objective lens comprising a plurality of optical components (such as one or more lenses, filters and/or apertures). In the sense of bionics, the function of the optical element in the ommatidium is similar to that of the lens in the single eye of compound eye animals. The photosensitive unit corresponding to the same optical element in the above mentioned ommatidium can be regarded as the pixel arranged on the focal plane of the optical element, and an array formed by at least two photosensitive units corresponding to the same optical element can be referred as a pixel array. In the sense of bionics, multiple photosensitive units are used to perform the function similar to that of the photoreceptor cells under each single eye in compound eyes of animals.

In the pixel array, each photosensitive unit may comprise a photodiode and a plurality of MOS transistors used as driving circuits. The photodiode can convert an incident light signal into an electrical signal. In order to obtain the electrical signal of the photosensitive unit, each ommatidium can further comprise a peripheral circuit electrically connected to each photosensitive unit, so as to transmit the image signal generated by the photosensitive unit about the incident light beam to the processor. The photosensitive unit is herein arranged near the focal plane of the optical element, which aims to locate the photosensitive surface of each photosensitive unit (such as the PN layer in the photodiode) on the focal plane of the optical element to detect the light information in the corresponding sight line. The structure of the pixel array formed by the photosensitive units can be implemented according to the disclosed technology, as long as the above mentioned functions can be realized. It can be known by combining with the Embodiment One that the intensity information of the incident light beams in different directions can be detected by using the photosensitive units at different positions in each ommatidium, by providing the ommatidium columns. More preferably, by optimizing the function and structure of the photosensitive unit in the ommatidium or the pixel array composed of photosensitive units, for example, by adding a filter layer between the optical element and the photosensitive unit, the color information of the received incident light beams can be acquired by using the photosensitive unit in each ommatidium, which is beneficial to obtaining the information of the photographed object more comprehensively.

Figure 8:
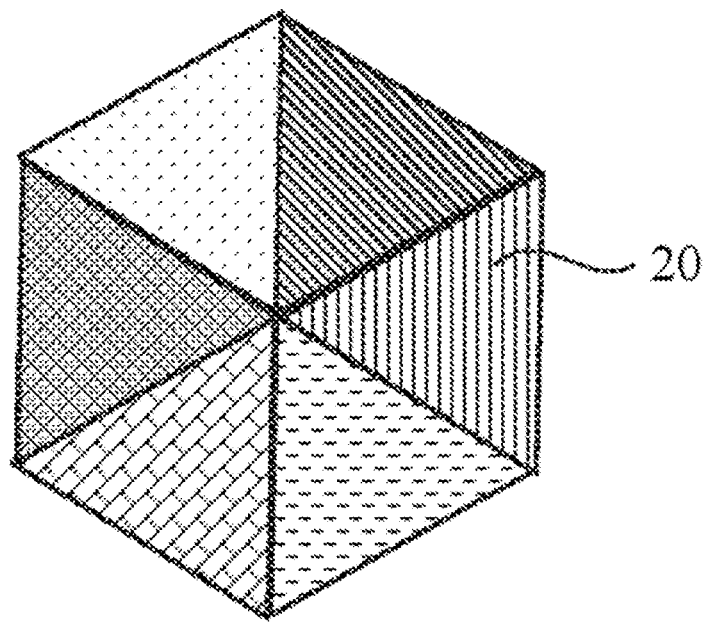
FIG. 8 is a schematic view of the ommatidia arranged in the shape of a hexagon in the compound eye camera device according to an embodiment of the present application.

The shape of the ommatidium can be configured to be similar to that of the pixel in a common camera or displayer. For example, the incident surface of each ommatidium can be configured to be in the shape of a quadrilateral and the ommatidia can be arranged horizontally and vertically. Or, the incident surface of each ommatidium can be configured to be in the shape of a hexagon like a honeycomb, etc. Optionally, as for the ommatidium array formed by multiple ommatidium columns, the optical elements of various ommatidia can be arranged in a honeycomb-shaped curved surface or in a two-dimensional plane. In industry, it is easier to produce and calculate the horizontal and vertical arrangement of quadrilateral ommatidia, but it is more advantageous to use hexagonal ommatidia for the honeycomb arrangement from the perspective of expanding the view or being closer to the bionic applications. FIG. 8 is a schematic view of the ommatidia arranged in the shape of a hexagon in the compound eye camera device according to an embodiment of the present application. Referring to FIG. 8, in an embodiment, the plane shape of each ommatidium 20 is triangular and six ommatidia are arranged into a hexagonal structure. For the purpose of a compact arrangement, the light-transmitting surface of the optical element can be configured to be hexagonal as for the ommatidium array with a honeycomb structure, and the light-transmitting surface of the optical element can be configured to be quadrilateral as for the ommatidium array with a quadrangular arrangement. The embodiments shown in FIG. 2 to FIG. 7 are described by taking an example that the ommatidium is cylindrical, wherein the shown optical element of each ommatidium is a circular microlens. However, the present application is not limited to this. In another embodiment, the structures of the optical components of various ommatidia in the ommatidium array can be the same or different. The optical components in the ommatidium array that can be implemented may not be exactly the same. The same structure or more than two different structures of the optical elements can be selected to be arranged to form the ommatidium column and the ommatidium array specifically according to the overall structural requirements of the compound eye camera device. For example, in one embodiment, the ommatidium array is in a curved structure, wherein the ommatidia with the first structure are used in most areas, and the ommatidia with the first structure all comprise photosensitive units with microlenses with the same shape and size. While in some special positions, the ommatidia with the second structure are used, and the ommatidia with the second structure comprise microlenses with the shape and size different from those of the ommatidia with the first structure or other kinds of optical elements. In addition, the ommatidia with the second structure can be interspersed and distributed within the scope of the ommatidium array according to a certain rule. In the same ommatidium column, the structures of the photosensitive elements arranged to be corresponding to the optical elements of the ommatidia can be the same or different. For example, in an embodiment, a part of the ommatidia in the same ommatidium column use the photosensitive elements of the first type, which comprise photosensitive units with the same number and arrangement (including the size of the photosensitive surface, spacing, etc.). The other part of the ommatidia use the photosensitive elements of the second type, which comprise photosensitive units with the number and/or arrangement different from those of the first type. In addition, in the example in which the microlenses are used as the optical elements of the ommatidia, the diameters of various microlenses can be the same or not be all the same, and their focal lengths can be the same or not be all the same. The structure of each ommatidium can be configured according to requirement. In general, if the diameter of the microlens is larger, the photosensitive ability is stronger. But when the number of photosensitive units remains unchanged, if the diameter of the microlens is smaller, photosensitive element is more sensitive to the change in the direction of incident light, that is, the visual resolution is higher.

In the ommatidium column, various ommatidia can be arranged in multiple ways. In order to reduce the volume of the compound eye camera device and improve the visual resolution without affecting the photosensitive ability, the incident surfaces of various ommatidia in the ommatidium column, especially in each sub-ommatidium column, are preferably close to each other. As an example, the microlenses of two adjacent ommatidia are adjacently arranged in each sub-ommatidium column and the microlenses of various ommatidia are closely arranged in the plane where the incident surface is located. The cross sections of the microlenses of various ommatidia which are parallel to the incident surface can be circular, elliptical or polygonal (such as quadrilateral, pentagon, hexagon, heptagon, octagon) etc.

As for the compound eye camera device of the embodiment, the total number of the photosensitive units corresponding to each ommatidium in the ommatidium array can be the same or different. Specifically, the photosensitive units in each ommatidium in the ommatidium array can be corresponding, that is, all the ommatidia are provided with photosensitive units corresponding to positions to detect sight lines in the same direction. The sight lines of photosensitive units corresponding to the same direction of sight lines do not intersect, and the information obtained respectively can be used to generate a single compound eye image.

While for the photosensitive units whose sight lines intersect in the view of ommatidia, the information obtained respectively is reflected in different single compound eye images, and since they all contain the information of the photographed object located at the intersection of sight lines, the single compound eye images which belong to the same ommatidium-column visual plane and in which the sight lines of at least part of the photosensitive units intersect each other can be matched, so as to obtain a group of matched compound eye images. Each of the single compound eye images in the matched compound eye images comprises a pixel point generated to be corresponding to the information of the photographed object at the intersection of the sight lines. Therefore, in this embodiment, if the sight lines of the photosensitive units in the same ommatidium intersect with the sight lines of the other ommatidia in the view of the ommatidium to generate multiple intersection points, each intersection point corresponds to a group of matched compound eye images composed of at least two single compound eye images, a group of matched compound eye images related to the same ommatidium, and single compound eye images formed by various photosensitive units in the ommatidium.

Embodiment Four

This embodiment mainly describes the field of view and the distance measuring accuracy of the compound eye camera device according to the embodiment of the present application.

As for the ommatidium column with non-intersecting sight lines shown in FIG. 3, the view and the field of view are determined by the position of the ommatidia at both ends and the photosensitive units. As for the ommatidium column with intersecting sight lines (as shown in FIG. 2 (*a*), FIG. 4, FIG. 5, FIG. 6, FIG. 7), more than one single compound eye images can be obtained, and a group of matched compound eye images can be obtained correspondingly. To determine the position of the photographed object at the intersection of sight lines, it is necessary to calculate the parallax according to the matched compound eye images. As for the ommatidium column with intersecting sight lines herein, the stereoscopic visible scope of the compound eye camera device can be acquired by obtaining the position and the direction of the outermost sight line of the outermost ommatidium in the ommatidium column which intersects with sight lines of other ommatidia.

Figure 9:
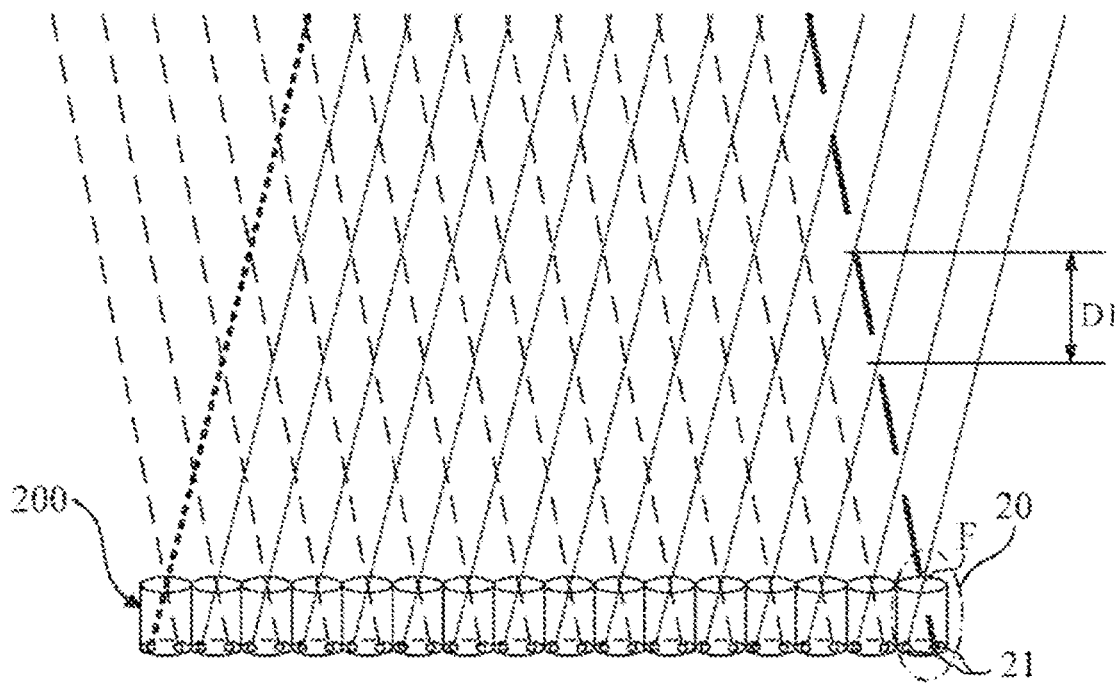
FIG. 9 is a schematic view of visible scope of the compound eye camera device according to an embodiment of the present application.

FIG. 9 is a schematic view of visible scope of the compound eye camera device according to an embodiment of the present application. Referring to FIG. 9, as an example of the present application, each ommatidium 20 has two photosensitive units 21 located on the focal plane from perspective of the ommatidium-column visual plane belonging to the ommatidium column 200. The two directions of sight lines determined by the connecting lines from the centers of the two photosensitive units 21 to the corresponding optical center F of the ommatidium 20 are the two incident directions of the light beams that can be obtained by the ommatidium column 200 to which the ommatidium 20 belongs. That is, only the light beams determined by the two directions of sight lines can be obtained by the photosensitive units 21 in all the ommatidia 20. The intersection points of the optical axes of all the ommatidia 20 in the ommatidium column 200 are the spatial points where the distance can be measured by using the light beams in the two directions. The spacing of the spatial points where the distance can be measured in the normal direction of the ommatidium column 200 is the distance measuring accuracy D1 of the ommatidium column in the spatial depth direction. The distance measuring accuracy herein reflects the distance accuracy between the two distinguishable adjacent spatial points of the same photosensitive unit 21 in the above normal direction. In the embodiments shown in FIG. 4, FIG. 5 and FIG. 9, the distance measuring accuracy D1 remains almost unchanged as the spatial depth direction changes.

According to the visual scope of the ommatidium column 200, the field of view (FOV) of the ommatidium column 200 can be obtained. Since the measurable direction of sight line is determined by the line connecting the center of the photosensitive unit 21 in the ommatidium column 200 and the optical center C of the corresponding ommatidium, the field of view of the ommatidium column 200 is related to the width of the pixel array composed of the photosensitive units in each ommatidium 20. The field of view of the ommatidium column in the present application reflects the angle that the stereoscopic visible scope deviates outward relative to the normal direction, and it is also referred as the stereoscopic field of view. In the embodiment shown in FIG. 9, the visible scope defined by the two thick lines is the field of view of the compound eye camera device. Since the stereoscopic visible scope does not deviate outward relative to the ommatidium column in the form of the straight line segment, the field of view of the ommatidium column shown in FIG. 9 is less than 0.

Figure 10:
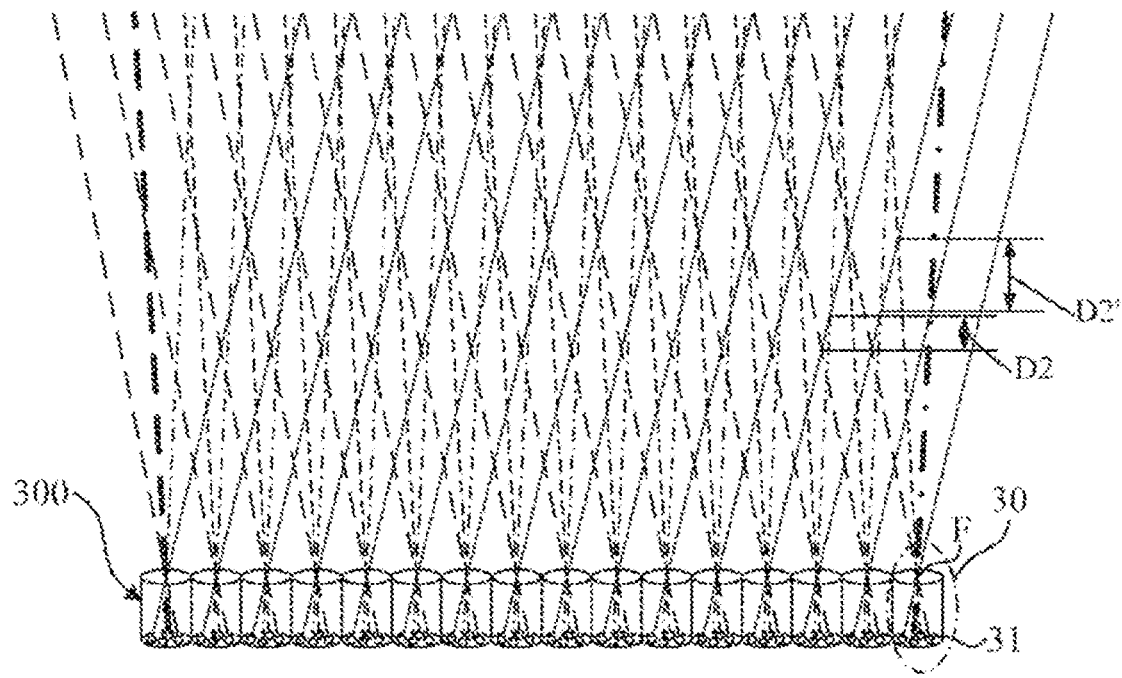
FIG. 10 is a schematic view of visible scope of the compound eye camera device according to an embodiment of the present application.

When the number of photosensitive units in the ommatidia increases, the field of view will change. FIG. 10 is a schematic view of visible scope of the compound eye camera device according to an embodiment of the present application. Referring to FIG. 10, as an example, each ommatidium 30 has four photosensitive units 31 located on the focal plane in the ommatidium column 300. The directions of sight lines determined by the connecting lines from the centers of the four photosensitive units 31 to the corresponding optical center F of the ommatidium are the four measurable directions of sight lines of the ommatidium column 300. In this embodiment, the stereoscopic field of view determined by the outermost sight line of the outermost ommatidium that can intersect with the sight lines of other ommatidia is greater than 0 (that is, the scope defined by the two thick lines as shown in FIG. 10) and is larger than that of the ommatidium column 200 in the embodiment shown in FIG. 9. However, the distance measuring accuracy D2' in the peripheral area of the view in FIG. 10 is significantly smaller than the distance measuring accuracy D2 in the center area of the view. Therefore, if it is necessary to maintain relatively good distance measuring accuracy in a two-dimensional plane, the view of the ommatidium array arranged in the form of the straight line segment should be relatively narrow. In another word, when a compound eye camera device is made by using the ommatidium column according to this embodiment of the present application, if the length of the ommatidium column in a certain direction is not long enough, the ommatidia are preferably arranged in the form of an arc line segment, in order to avoid the measurable scope being too narrow. It is further illustrated by embodiment as follows.

Figure 11:
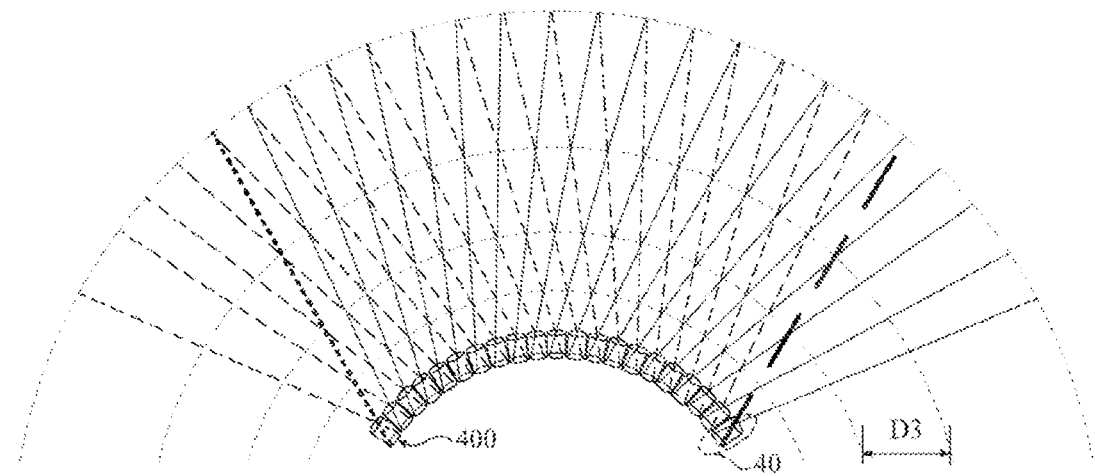
FIG. 11 is a schematic view of visible scope of the compound eye camera device according to an embodiment of the present application.

FIG. 11 is a schematic view of visible scope of the compound eye camera device according to an embodiment of the present application. Referring to FIG. 11, as an example, various ommatidia 40 of the ommatidium column 400 are arranged in the form of an arc line segment (that is, the line connecting the optical centers is an arc line). Each ommatidium 40 has two photosensitive units located on the focal plane, and the directions of the optical axes determined by the connecting lines from the two photosensitive units to the optical center of the corresponding ommatidium 40 are the measurable directions of sight lines of the ommatidium column 400. FIG. 10 additionally illustrates the stereoscopic visible scope (that is, the scope defined by the two thick lines as shown in FIG. 11) of the ommatidium array 400 determined by the outermost sight line of the outermost ommatidium that can intersect with the sight lines of other ommatidia. Obviously, the field of view of the ommatidium array 400 with the structure of the arc line segment is larger than that of the ommatidium array 200 with the structure of the straight line segment having the same number of photosensitive units shown in FIG. 8. In addition, as shown in FIG. 11, as for the ommatidium column 400 with the structure of the arc line segment, the distance measuring accuracy D3 of the ommatidium column gradually decreases when the distance from the ommatidium row 400 goes from the nearest to the farthest in the normal direction.

In this embodiment, when the distance measuring accuracy of the ommatidium array is higher, the resolution of the compound eye camera device is higher. Moreover, the maximum resolution is mainly related to the spacing between adjacent ommatidia and the positions of the outermost photosensitive units, so the spacing between the ommatidia and the positions of the photosensitive units can be adjusted according to requirements to improve the resolution of the compound eye camera device.

The arrangement and spacing of the plurality of ommatidia in the ommatidium column of the present application can be configured according to the requirements for the field of view, distance measuring accuracy, etc. In the preferred solution, the field of view can be increased by increasing the number of photosensitive units in the ommatidium or arranging each ommatidium in the form of the arc line segment. In addition, from the perspective of the effect and process difficulty, it is preferable to arrange the ommatidia in the form of the arc line segment (or sphere) compared with increasing the number of photosensitive units. When the field of view is larger, the compound eye camera device can "see" farther, and when the photographed object is farther, the image is smaller. As for the ommatidium column with the structure of the straight line segment and the ommatidium array in the form of the two-dimensional plane, the spatial resolution almost does not change with the change of distance, but the view scope is limited by the two-dimensional area of the ommatidium array, which is embodied as a columnar space. Therefore, when a compound eye camera device is made by using the ommatidium array of the embodiment of the present application, it is preferable to adopt the ommatidia arranged in the form of the arc line segment (or sphere) as shown in FIG. 11. On one hand, the view is wider; and on the other hand, when the object is farther, the images are smaller, so that the bionic effect is better.

Embodiment Five

This embodiment mainly describes the parallax caused by the ommatidium column.

It can be seen from the description of the compound eye camera device in the preceding embodiments that the processor can obtain single-compound eye images and a group of matched compound eye images including at least two single compound eye images respectively by using the unit for imaging each single compound eye image and the unit for matching compound eye images, by using the ommatidium column of the compound eye imaging device of the present application. Parallax is observed from various single compound eye images in the matched compound eye images.

Figure 12:
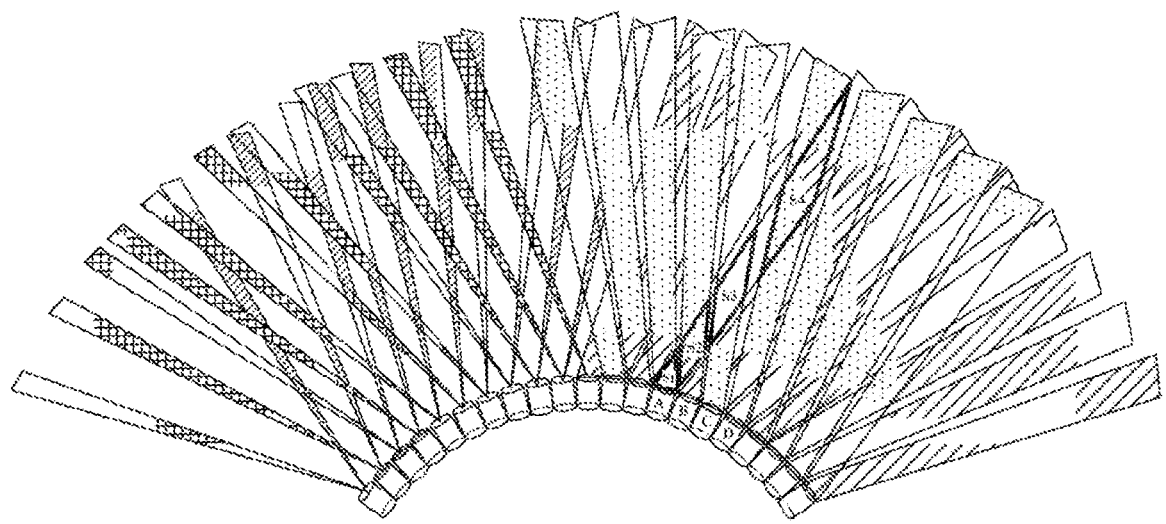
FIG. 12 is a schematic view of optical center cones and pixel surface photosensitive light beams of the ommatidium column according an embodiment of the present application.

FIG. 12 is a schematic view of optical center cones and pixel surface photosensitive light beams of the ommatidium column according an embodiment of the present application. The left half of FIG. 12 illustrates the distribution of the optical center cones, and the right half illustrates the distribution of the pixel surface photosensitive light beams. In the ommatidium column shown in FIG. 12, each ommatidium has two photosensitive units arranged in the photosensitive surface. In addition, the sight lines of the photosensitive units at corresponding positions in various ommatidia do not intersect in the view of the ommatidium column, and the sight lines of the photosensitive units at other corresponding positions in various ommatidia do not intersect in the view of the ommatidium column either. Therefore, two single compound eye images can be obtained according to the signals of the two corresponding kinds of photosensitive units in various ommatidia. As for the photosensitive units that are not in the corresponding positions, their sight lines intersect in the view of the ommatidium column, so parallax is observed from the pixel points reflecting the same intersection point in the two single compound eye images, forming a group of matched compound eye images.

As an example, taking the image of the ommatidium A as the reference image, the first detecting area S1 is an area that can be detected simultaneously by the two photosensitive units (or pixels) inside the ommatidium A, so the parallax is 0. The second detecting area S2 is an area that can be detected simultaneously by the left photosensitive unit of the ommatidium A and the right photosensitive unit of the ommatidium B, and the parallax is 1 (the ommatidium is herein taken as a unit exemplarily, and in other embodiments, the photosensitive unit can be taken as a unit). According to the same method, it can be known that the third detecting area S3 is an area that can be detected simultaneously by the left photosensitive unit of the ommatidium A and the right photosensitive unit of the ommatidium C, and the corresponding parallax is 2; the fourth detecting area S4 is an area that can be detected simultaneously by the left photosensitive unit of the ommatidium A and the right photosensitive unit of the ommatidium D, and the corresponding parallax is 3; by analogy, the parallax caused by the pixel surface photosensitive light beams in different detecting areas after they are incident into various ommatidia. It can be seen that, after the structural data of the ommatidium column, such as the arrangement of the ommatidia, the spacing between the ommatidia, the size of the photosensitive units and spacing between them, etc. is obtained, the parallax can be obtained after the above mentioned matched compound eye images are calculated, and the specific location of the photographed object or spatial points in three-dimensional space can be further calculated and derived.

After the three-dimensional space information of the photographed object at multiple continuous time points is obtained, the moving information of the photographed object in the three-dimensional space can be further obtained. The three-dimensional space information and moving information of the photographed object can be represented and output by using the stereo coordinate system, or be demonstrated by using three-dimensional stereoscopic technologies of VR, AR, MR, etc.

Embodiment Six

Figure 13:
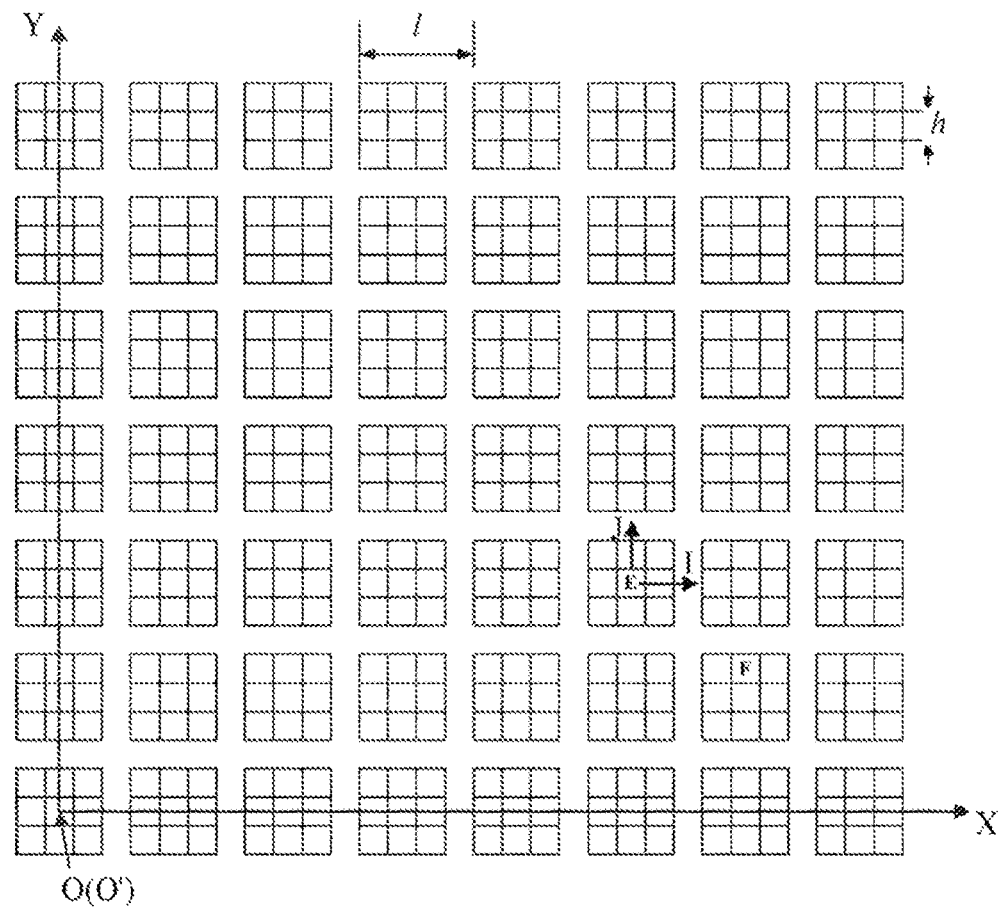
FIG. 13 is a plane sketch view of the ommatidium array according an embodiment of the present application.

FIG. 13 is a plane sketch view of the ommatidium array according an embodiment of the present application. Referring to FIG. 13, in an embodiment, multiple ommatidium columns are neatly arranged in a two-dimensional plane horizontally and vertically. Each ommatidium is correspondingly provided with several photosensitive units arranged horizontally and vertically. In FIG. 13, the position of the optical center of each ommatidium is the same as the center position of the pixel array formed by the corresponding photosensitive units.

The optical element of each ommatidium is, for example, a microlens. And the microlens array, that is, the ommatidium array, is represented by X×Y, where X and Y are both integers greater than 1. As shown in FIG. 13, in one embodiment, X=8, Y=7. In addition, the pixel array formed by the photosensitive units in each ommatidium is represented by I×J, where I and J are both integers greater than 1. In one embodiment, I=3, J=3. That is, what is shown in FIG. 13 is an ommatidium array of 8×7, and each ommatidium comprises 3×3 pixels. In this embodiment, the acquisition of the position (or depth) of the spatial points by the processor may include the following process.

Firstly, after the image signals generated by the photosensitive units of all the ommatidia are obtained, the image signals of the photosensitive units from various ommatidia with non-intersecting sight lines are processed into a single compound eye image, so as to obtain at least two single-compound eye images. The image signals of the photosensitive units of the ommatidia are preferably signals obtained at the same time point or in the same time period. The dynamic photographed object can be captured by tracking the position of the photographed object at multiple time points or in the same time period, which can thus achieve dynamic camera capability.

As for the above mentioned X×Y ommatidium array, I×j single compound eye images in the size of X×Y can be obtained. That is to say, in the example of FIG. 13, nine single compound eye images can be obtained. In each single compound eye image, there are a total of 8×7 pixel points. It can be considered that the size of each single compound eye image is 8×7. The pixel points herein refer to the images in the corresponding single compound eye image reflecting the image signals generated by the photosensitive units. It should be noted that the specific number of the ommatidia shown in FIG. 13 is just for description. In other embodiments of the present application, the number of the ommatidia and the number of photosensitive units in the ommatidium used to construct the compound eye camera device can be different from those shown in FIG. 13. For example, in one embodiment, the number of the ommatidia can be much larger than that of photosensitive units in the pixel array corresponding to each ommatidium.

Figure 14:
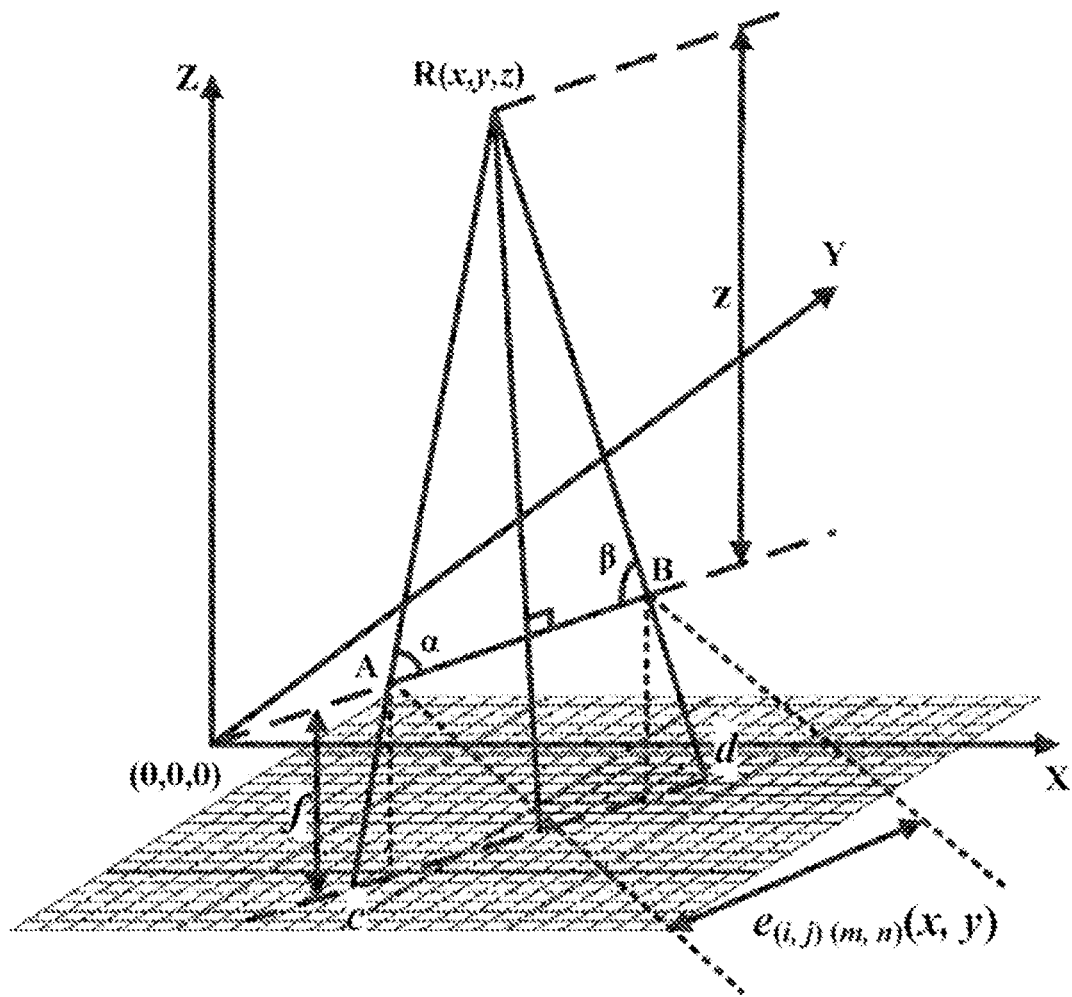
FIG. 14 is a schematic view showing distance measurement of the compound eye camera device according to an embodiment of the present application.

Referring to FIG. 13, the distance between two adjacent microlenses, that is, the distance between two adjacent ommatidia, is configured to be 1, the distance between two adjacent photosensitive units in each ommatidium is configured to be h, and the distance from the optical center of each microlens to the photosensitive surface of the photosensitive unit is configured to be f (see in FIG. 14). In the ommatidium array shown in FIG. 13, the coordinate system of the plane where the ommatidium array is located is the ommatidium array coordinate system $\Sigma_{XY}$, the origin O of which is set in the center of the ommatidium at the lower left corner, and the position of each ommatidium can be determined according to its coordinates in the ommatidium array coordinate system $\Sigma_{XY}$. The unit of the ommatidium array coordinate system $\Sigma_{XY}$ is 1. In addition, the coordinate system where the photosensitive units in each ommatidium are located is the pixel array coordinate system $\Sigma_{IJ}$, the origin O' of which is set in the center of the central photosensitive unit of each ommatidium. Therefore, the position of each photosensitive unit in the ommatidium can be determined according to its coordinates of the pixel array coordinate system $\Sigma_{IJ}$, and the unit of the pixel array coordinate system $\Sigma_{IJ}$ is h. The photosensitive unit E shown in FIG. 13 corresponds to the origin of the pixel array coordinate system $\Sigma_{IJ}$ of the microlens with coordinates (5, 2) in the ommatidium array coordinate system $\Sigma_{XY}$.

FIG. 14 is a schematic view showing distance measurement of the compound eye camera device according to an embodiment of the present application. FIG. 14 can be regarded as the ommatidium array coordinate system $\Sigma_{XY}$ in FIG. 13, which adds on the depth coordinate axis Z, so that a photographed object located in a three-dimensional space (represented herein by a spatial point R) can be illustrated. The coordinate system of FIG. 13 is hereinafter referred to as the compound eye coordinate system $\Sigma_{XYZ}$ the origin of which is set in the optical center of the ommatidium at the lower left corner as shown in FIG. 12. As an example, the array surface of the ommatidium array is a two-dimensional plane, and the structure of each ommatidium is the same. The position of the corresponding ommatidium can be directly represented by the array where each ommatidium is located, and the plane of the ommatidium array can be configured to be parallel to the plane of the pixel array, and the line connecting the optical center of each ommatidium and the center of the pixel array of ommatidium is perpendicular to the plane of the pixel array. It should be noted that the above configurations in FIG. 14 are only for the convenience of description, and do not constitute a limitation to the compound eye camera device of the present application. In another embodiment of the present application, the pixel array of each ommatidium can also have a certain curvature, and the line connecting the optical center of each ommatidium and the center of the corresponding pixel array may not be perpendicular to the plane of the ommatidium array.

Referring to FIG. 14, the image signals of the spatial point R is detected by both ommatidia in the ommatidium array. The coordinates of the spatial point R in the compound eye coordinate system are (x, y, z). Specifically, the optical center A of the first ommatidium (to facilitate discussion, this ommatidium is referred as ommatidium A) has coordinates $(x_A, y_A, f)$ in the compound eye coordinate system $\Sigma_{XY}$. As for the ommatidium A, the photosensitive unit c that generates the image signal of the spatial point R has coordinates $(1,1)$ in the pixel array coordinate system $\Sigma_{IJ}$, and the beam intensity (or brightness) of the photosensitive unit c is expressed as $u_{i,j}(x,y)$. The information of the photosensitive units in each ommatidium whose sight lines do not intersect with the sight lines of the photosensitive unit c at the same time point is arranged in the order of the position of the ommatidium to form a single compound eye image, which is referred as the first compound eye image $U_{i,j}$ at time point t. Similarly, as for the other ommatidium that detects the image signals of the spatial point R, its optical center B (to facilitate discussion, this ommatidium is referred as ommatidium B) has coordinates $(x_B, y_B, f)$ in the compound eye coordinate system $\Sigma_{XY}$. As for the ommatidium B, the photosensitive unit d that generates the image signal of the spatial point R has coordinates (m,n) in the pixel array coordinate system $\Sigma_{IJ}$. The sight lines of the photosensitive unit c and the photosensitive unit d intersect in the view, and they both detect the image information of the same spatial point R. The information of the photosensitive units in each ommatidium whose sight lines do not intersect with the sight lines of the photosensitive unit d at the same time point can also be arranged in the order of the position of the ommatidium to form a single compound eye image, which is referred as the second compound eye image $U_{m,n}$ at time point t.

Referring to FIG. 14, when the four points c, A, B, d are on the same ommatidium-column visual plane, the sight line cA and the sight line dB can intersect at the spatial point R in space. The spatial point R generates an image signal by using the photosensitive unit c in the ommatidium A, and the image signal is embodied as a pixel point in the first compound eye image $U_{i,j}$ which is marked as the pixel point c; the spatial point R also generates an image signal by using the photosensitive unit d in the ommatidium B, and the image signal is embodied as a pixel point in the second compound eye image $U_{m,n}$, which is marked as the pixel point d. The coordinates of pixel point in the first compound eye image $U_{i,j}$ are set to be $(x_c, y_c)$, and the coordinates of pixel point d in the second compound eye image $U_{m,n}$ are set to be $(x_d, y_d)$. Both pixel points c and d reflect the information of the spatial point R, so they are a set of corresponding pixel points. The pixel points c and d represent the mapping of the same spatial point R in real space into the two single-compound eye images, the two single-compound eye images can form a group of matched compound eyes.

The methods for obtaining the pixel points (such as the above pixel points c and d) belonging to the mapping from the same spatial point and thus having corresponding relationship from the single compound eye images can adopt the stereo matching algorithm disclosed in the art, such as the sift algorithm, the surf algorithm, the global stereo matching algorithm or the local stereo matching algorithm. Taking the local stereo matching algorithm as an example, which is also referred as a window-based method or a method based on support region, the local stereo matching algorithm calculates a window with a suitable size, shape and weight for each pixel point in the reference image, and then averages the weighted values of parallax within this window. The ideal support window can completely cover the weakly textured area and be continuous in depth within the window. Similar to the global stereo matching algorithm, the optimal parallax is calculated by optimizing a cost function. The specific process in the disclosed technology in the art can be for reference, and details are not repeated herein.

The process of obtaining the spatial depth information of the spatial point R (that is, the coordinates in the Z direction) is described as follows.

Referring to FIG. 14, the parallax caused by the first compound eye image $U_{i,j}$ composed of the pixel positions (i,j) in each lens and the second compound eye image $U_{m,n}$ composed of the pixel positions (m,n) in each lens at the pixel point (x,y) in the first compound eye image $U_{i,j}$ is expressed as $e_{(i,j)(m,n)}(x,y)$. Specifically, taking the first compound eye image $U_{i,j}$ as the reference image, the distance between the pixel point d and the pixel point c in the X-axis direction is the parallax of the pixel point d in the X-axis direction, which is expressed herein as $e_{(i,j)(m,n)}(x)$; the distance between the pixel point d and the pixel point c in the Y-axis direction is the parallax of the pixel point d in the Y-axis direction, which is expressed herein as $e_{(i,j)(m,n)}(y)$. The linear distance between the pixel point d and the pixel point c, that is, the parallax of the pixel point d, can be expressed as $e_{(i,j)(m,n)}(x,y)$.

When the focal length of the microlens is sufficiently small, it can be considered that AB≈cd. Therefore, $e_{(i,j)(m,n)}(x,y)$ can also represent the distance between the optical centers A and B of the two ommatidia, namely, the length of AB. According to the positions of the two ommatidia, the relationship between the parallax $e_{(i,j)(m,n)}(x)$ of the pixel point d in the X-axis direction and the distance of the corresponding two ommatidia in the X-axis direction can be obtained, and the relationship between the parallax $e_{(i,j)(m,n)}(y)$ of the pixel point d in the Y-axis direction and the distance of the corresponding two ommatidia in the Y-axis direction can be obtained. However, the above mentioned relationship between the parallax and the distance between the ommatidium A and the ommatidium B is only an example of the present application. In another embodiment, the relationship between the parallax observed from the corresponding photosensitive units in the two ommatidia and the distance between ommatidia can also be obtained by using a more precise calculation process, such as the calculated $AB=cd-\sqrt{i^2+j^2}-\sqrt{m^2+n^2}$ in another embodiment (cd is the distance between the photosensitive unit c and the photosensitive unit d). In a word, the parallax of the same spatial point R detected by two ommatidia can be obtained by processing the first compound eye image $U_{i,j}$ and the second compound eye image $U_{m,n}$.

In this embodiment, the parallax of the pixel point d based on the reference image satisfies the following relational expression (1):

$$e_{(i,j)(m,n)}(x,y) = \sqrt{e^2_{(i,j)(m,n)}(x) + e^2_{(i,j)(m,n)}(y)} \quad (1)$$

The angle α between the straight line AR and the plane where the pixel array of the ommatidium A is located satisfies the following relational expression (2):

$$\tan\alpha = \frac{f}{\sqrt{i^2 + j^2}} \quad (2)$$

The angle β between the straight line BR and the plane where the pixel array of the ommatidium B is located satisfies the following relational expression (3):

$$\tan\beta = \frac{f}{\sqrt{m^2 + n^2}} \quad (3)$$

Based on the above relationship, the spatial depth of R, that is, the coordinate z of R in the compound eye coordinate system $\Sigma_{XYZ}$ can be obtained, which is:

$z = e_{(i,j)} \tan \alpha$ $= (e_{(i,j)(m,n)}(x,y) - e_{(i,j)}) \tan \beta$ $= e_{(i,j)(m,n)}(x,y) \tan \beta - e_{(i,j)} \tan \beta$ Then, get $e_{(i,j)} =$ $$\frac{e_{(i,j)(m,n)}(x,y)\tan\beta}{\tan\alpha + \tan\beta} = \frac{e_{(i,j)(m,n)}(x,y)\frac{f}{\sqrt{m^2+n^2}}}{\frac{f}{\sqrt{i^2+j^2}} + \frac{f}{\sqrt{m^2+n^2}}} = \frac{e_{(i,j)(m,n)}(x,y)\sqrt{i^2+j^2}}{\sqrt{m^2+n^2} + \sqrt{i^2+j^2}}$$

So z satisfies the following relational expression (4), $$z = \frac{f}{\sqrt{m^2+n^2} + \sqrt{i^2+j^2}} e_{(i,j)(m,n)}(x,y) \quad (4)$$

Therefore, x and y satisfy the following relational expressions (5) and (6) respectively, $$x = x_c - z\frac{i}{f} = x_c - \frac{i}{\sqrt{m^2+n^2} + \sqrt{i^2+j^2}} e_{(i,j)(m,n)}(x,y) \quad (5)$$

$$y = y_c - z\frac{j}{f} = y_c - \frac{j}{\sqrt{m^2+n^2} + \sqrt{i^2+j^2}} e_{(i,j)(m,n)}(x,y) \quad (6)$$

It can be seen that the coordinates (x, y, z) of the spatial point R are related to the structure of the ommatidia and parallax, and they can be obtained by using the coordinate information of the two ommatidia in the ommatidium array coordinate system, the corresponding coordinate information of two photosensitive units having detected the image information of the spatial point specifically in the pixel array coordinate system, and the parallax observed from the corresponding pixel points on the two images. If the photographed object is a combination of multiple spatial points, the stereoscopic information of the photographed object can be obtained by obtaining the depth of each spatial point in the view.

As for the spatial intersection points determined by the non-intersecting sight lines in the sub-ommatidium columns separated by a set distance as shown in FIG. 6 and FIG. 7, the set distance between the two sub-ommatidium columns needs to be taken into consideration when calculating the parallax, and the coordinates of the spatial point are also related to the set distance.

In the above embodiments, the ommatidium array and the pixel array are regarded as two-dimensional planes for calculation. However, it can be understood that if the spatial distribution of various ommatidia in the ommatidium array is not a plane (for example, a sphere as shown in FIG. 11), as long as the relative position of each ommatidium is fixed, that is, the relative position data of each ommatidium is known or it can be measured, the single compound eye images can be obtained by processing the image signals obtained by the ommatidia, matched compound eye images can be obtained by using two or more single compound eye images, and the parallax information of the corresponding pixel points in a group of matched compound eye images can be obtained by visual processing of the matched compound eye images. And the three-dimensional space information of the photographed object can be further obtained by using the structure information of the ommatidium array, the structure information and the sight line information of the pixel array in the ommatidium, and the parallax information, thus realizing stereoscopic vision.

Embodiment Seven

If the spatial distribution of the ommatidia is not a plane, but is in an arbitrary fixed shape and is fixed on a certain device (such as a head), the coordinates of each ommatidium in the coordinate system of the device are fixed. This embodiment mainly describes the process of obtaining three-dimensional space information of spatial points by using two ommatidia in any poses.

Figure 15:
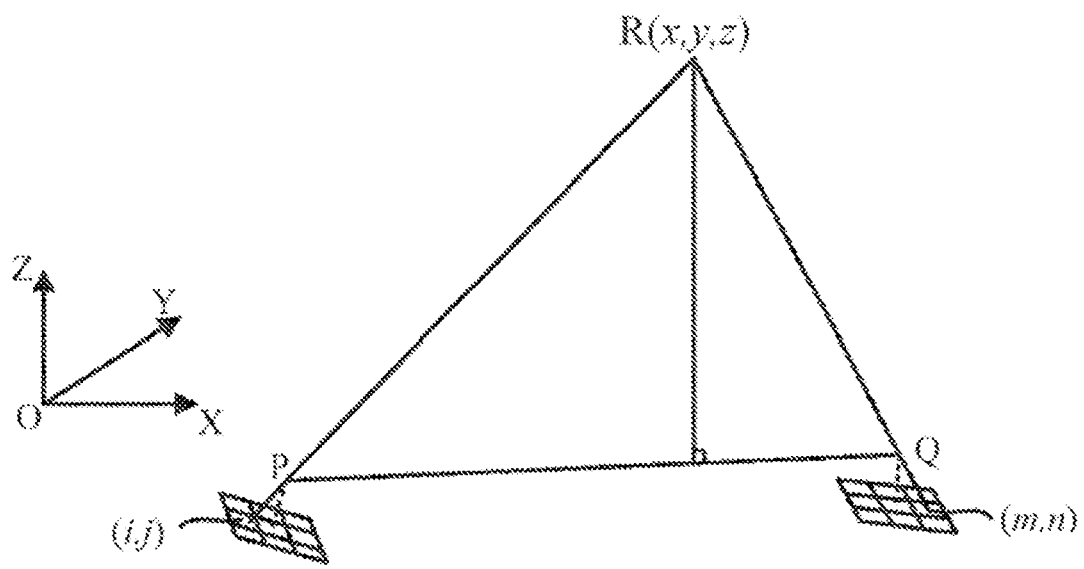
FIG. 15 is a schematic view showing distance measurement of the compound eye camera device according to an embodiment of the present application.

FIG. 15 is a schematic view showing distance measurement view of the compound eye camera device according to an embodiment of the present application. Referring to FIG. 15, two ommatidia P, Q in any pose can detect the light beams emitted by the spatial point R, thereby obtaining the corresponding image signals. The coordinates of the optical center of the ommatidium P are herein set as $(x_p, y_p, z_p)$, and the direction of the central optical axis of the ommatidium P (that is, the straight line passing through the optical center of the microlens and being perpendicular to the incident surface) is represented by the Euler angle $(\alpha_p, \beta_p, \gamma_p)$, and the pose parameters of the ommatidium P can be represented by $(x_p, y_p, z_p, \alpha_p, \beta_p, \gamma_p)$. Similarly, the coordinates of the optical center of the ommatidium Q can be set as $(x_q, y_q, z_q)$, and the direction of the central optical axis of the ommatidium Q is represented by the Euler angle $(\alpha_q, \beta_q, \gamma_q)$, and the pose parameters of the ommatidium Q can be represented by $(x_q, y_q, z_q, \alpha_q, \beta_q, \gamma_q)$. Two single compound eye images can be generated according to the detection signals of the two groups of photosensitive units with non-intersecting sight lines in the ommatidium P and the ommatidium Q, wherein the pixel point $u_{i,j}(x_p, y_p)$ (,) of the first compound eye image $U_{i,j}$ corresponds to the imaging of the spatial point R on the ommatidium P in real space, and the pixel point $u_{m,n}$ ($x_q$, $y_q$) of the second compound eye image $U_{m,n}$ corresponds to the imaging of the spatial point R on the ommatidium Q, so the first compound eye image $U_{i,j}$ and the second compound eye image $U_{m,n}$ are a group of matched compound eye images, so the coordinates (x, y, z) of R can be calculated according to ($x_p$, $y_p$, $z_p$, $\alpha_p$, $\beta_p$, $\gamma_p$), ($x_q$, $y_q$, $z_q$, $\alpha_q$, $\beta_q$, $\gamma_q$) and (i,j), (m,n). The specific description is as follows.

In the three-dimensional space, the coordinates of the optical center of the ommatidium P is represented by a vector p, which is related to the coordinates of the ommatidium P, and can be expressed as p=OP=($x_p$, $y_p$, $z_p$), wherein O is the origin of the ommatidium coordinate system. The photosensitive unit corresponding to the spatial point R in the ommatidium P has coordinates (i,j) in the pixel array (wherein the origin is marked as O) is, and has coordinates ($x_i$, $y_i$, $z_i$) corresponding to the three-dimensional space. The light direction $d_i$=OP=oi=($x_p-x_i$, $y_p-y_i$, $z_p-z_i$) can be obtained by the corresponding photosensitive unit (i,j) in the ommatidium P, and then the parametric equation of the light PR can be expressed as p+$k_i d_i$, wherein $k_i$ is the coefficient.

Similarly, the coordinates of the optical center of the ommatidium Q can be represented by a vector q, which is related to the coordinates of the ommatidium Q, and can be expressed as q=OQ=($x_q$, $y_q$, $z_q$). The photosensitive unit corresponding to the light beams emitted by the spatial point in the ommatidium Q has coordinates (m,n) in the pixel array (wherein the origin is marked as O), and has coordinates ($x_m$, $y_m$, $z_m$) corresponding to the three-dimensional space. The light direction $d_2$=($x_q-x_m$, $y_q-y_m$, $z_q-z_m$) can be obtained by the corresponding photosensitive unit (m,n) in the ommatidium Q. The parametric equation of the light QR can be expressed as q+$k_2 d_2$, wherein $k_2$ the left 2 is the coefficient.

Since the light PR and the light QR intersect at the spatial point R, it can be set that when k2=k and the light QR gets the spatial point R, the vector of the spatial point R is R=q+$kd_2$ of the. At this time, $\overrightarrow{RP} \times d_1 = 0$, that is, (q+$kd_2$-p)×$d_1$=0, and thus it can be obtained that $$k = \frac{(p-q) \times d_1}{d_2 \times d_1}$$

can be obtained, and that the coordinate of the spatial point R is $$q + \frac{(p-q) \times d_1}{d_2 \times d_1}.$$

This is an ideal situation. Considering that there may be errors in practical applications, vector division is inconvenient to calculate, and it can be replaced by $$k = \frac{((p-q) \times d_1)(d_2 \times d_1)}{\|d_2 \times d_1\|}.$$

Therefore, the coordinate of the spatial point R is $$q + \frac{((p-q) \times d_1)(d_2 \times d_1)}{\|d_2 \times d_1\|} d_2.$$

Combining with the description of the compound eye camera device in the preceding embodiments, it can be seen that, specifically, the processor can obtain the image signals generated by all the ommatidia by using the signal processing unit, the image processing unit and the position analyzing unit, and then realize two-dimensional vision with high clarity of sight lines by forming at least one single-compound eye image. In addition, for any two single compound eye images with intersecting sight lines, they can be used as matched compound eye images to obtain the parallax information of the corresponding pixel points therein. And the three-dimensional space information of the photographed object can be obtained by calculation by using the structural information of the ommatidium array such as the distance information of the ommatidia, the information about the sight lines of the photosensitive units, and the parallax information. It can be seen that the compound eye camera device has a three-dimensional image acquisition function by means of the above ommatidium array and the processor with bionic structure design, and it can be used to detect the position of the photographed object and obtain the three-dimensional image of the photographed object, which is beneficial to acquiring accurate three-dimensional space information and achieving relatively good stereoscopic vision.

Embodiment Eight

This embodiment mainly describes a compound eye system. The compound eye system comprises a plurality of the compound eye camera devices arranged at spacing. From the perspective of bionics, the function of the compound eye system herein is similar to that of a group of compound eyes (such as the two compound eyes of a dragonfly) of compound eye animals.

The plurality of compound eye camera devices in the above compound eye system can be respectively arranged at different positions of the functional main body according to design requirements, so as to perform three-dimensional stereoscopic measurement from different directions, or the plurality of compound eye camera devices can also be distributed symmetrically relative to a center point or a center line. From the perspective of bionics, many compound eye animals work through two compound eyes that are symmetrical along the center line (although human eyes are not compound eyes, they are also symmetrical along the center line), so the compound eye system of this embodiment can be applied to the design of visual systems of intelligent robots, but this is not restrictive. In other embodiments, the above compound eye system can also be applied to radar systems, missile guidance devices, micro aircraft, systems for ship searching and tracking, night vision equipment, micro compound eye cameras, etc. According to the specific requirements for three-dimensional detection, the two or more compound eye camera devices used at the same time, especially the ommatidium array, can be vertically symmetrical or horizontally symmetrical to a center line used as an axis line, or can be symmetrical to a center part (or a center point). Alternatively, they can be distributed asymmetrically.

In addition to the compound eye camera device, the above compound eye system can further comprise a control device for controlling the poses of the ommatidium columns in the compound eye camera device. The poses of the ommatidium columns herein mainly refer to the directions of the ommatidium columns when taking images. The controller can be implemented by the CPU of a computer. The control device is connected with the processor of each compound eye camera device. In addition to the poses of the ommatidium columns, the control device can also control the process for obtaining the two-dimensional and/or three-dimensional space information of the photographed object by each processor, such as controlling the processors of the corresponding part of the ommatidium array to work, etc. The control device can also analyze and process the three-dimensional space information of the photographed object output by each processor uniformly, such as eliminating the measurement errors between the two compound eye camera devices, and finally obtaining more accurate three-dimensional space information of the photographed object. From the perspective of bionics, the function of the control device is similar to that of the brain of the compound eye animals, playing a commanding role in the operation of the compound eye system.

Since each compound eye camera device can obtain the two-dimensional and/or three-dimensional space information of the photographed object in the view, the constructed compound eye system has a wider scope of view, which is beneficial to achieve better stereoscopic vision function.

The foregoing application has been described in accordance with the relevant legal standard, thus the description is exemplary rather than limiting in nature. Variations and modifications to the disclosed embodiment may become apparent to those skilled in the art and do come within the scope of the application. Accordingly, the scope of legal protection afforded by this application can only be determined by studying the following claims.

What is claimed is:

1. A compound eye camera device, comprising:
   ommatidium columns, each of which comprises a plurality of ommatidia that do not interfere with each other optically and are arranged in a column, and each of the ommatidia comprises an optical element and at least one photosensitive unit arranged near a focal plane of the optical element, wherein the optical element is used to face a photographed object and receive incident light beams within view, wherein each of the ommatidium columns corresponds to at least one ommatidium-column visual plane, the at least one ommatidium-column visual plane passing through an optical center of each ommatidium in the ommatidium columns and a position near centers of at least one photosensitive unit of each ommatidium, wherein each photosensitive unit intersects at least one ommatidium-column visual plane, and sight line of each photosensitive unit passes through a center of the photosensitive unit and an optical center of the ommatidium where it is located;
   a processor, which is configured to generate images based on information received by the photosensitive units in the ommatidia, and to process images to obtain information about the photographed object, wherein the processor comprises:
   a unit for imaging each single compound eye image, which is configured to process information of at least part of the photosensitive units with non-intersecting sight lines and compose an image after obtaining information of the photosensitive units of various ommatidia, so as to obtain at least one single compound eye image;
   a unit for matching compound eye images, which is configured to match at least two single compound eye images which belong to a same ommatidium-column visual plane and in which the sight lines of at least part of the photosensitive units intersect each other, so as to obtain a group of matched compound eye images; wherein each of the single compound eye images in the matched compound eye images comprises a pixel point formed in the single compound eye images according to information of the photographed object at an intersection of sight lines;
   a parallax calculating unit, which is configured to acquire parallax information between the pixel points in the matched compound eye images, which is generated according to information of the photographed object at the intersection of sight lines; and
   a position analyzing unit, which is configured to acquire information of the photographed object at the intersection of sight lines based on information of the ommatidium columns and the parallax information.

2. The compound eye camera device according to claim 1, wherein in the ommatidium columns, each ommatidium comprises one photosensitive unit, and the sight lines of various photosensitive units do not intersect each other within view of the ommatidium columns.

3. The compound eye camera device according to claim 1, in the ommatidium columns, each ommatidium comprises at least one photosensitive unit, and the sight line of at least one photosensitive unit intersects the sight lines of other photosensitive units within view of the ommatidium columns.

4. The compound eye camera device according to claim 1, wherein the compound eye camera device comprises at least two ommatidium columns, and an angle is formed between the ommatidium-column visual planes belonging to different ommatidium columns, and each ommatidium belongs to at least one ommatidium column.

5. The compound eye camera device according to claim 4, wherein a plurality of ommatidium columns adjoin in sequence to form an ommatidium array, and the optical elements of various ommatidia in the ommatidium array are arranged in one selected from the group consisting of a honeycombed curved surface and a two-dimensional plane.

6. The compound eye camera device according to claim 1, wherein the single compound eye images in the matched compound eye images are all acquired according to information of the photosensitive units in various ommatidia obtained at one selected from the group consisting of a same time and a same time period.

7. The compound eye camera device according to claim 6, wherein the position analyzing unit is further configured to acquire motion information of the photographed object in view according to information of the photographed object at one selected from the group consisting of multiple time points and a same time period.

8. The compound eye camera device according to claim 1, wherein the compound eye camera device further comprises:
   a storage unit, which is configured to store the single compound eye images, the matched compound eye images and information of the photographed object;
   a display unit, which is configured to perform a step selected from the group consisting of:
   outputting and displaying the single compound eye images; and
   outputting and displaying at least one of texture and color, three-dimensional position and pose attitude, and shape of the photographed object based on information of the photographed object acquired by the position analyzing unit.

9. The compound eye camera device according to claim 1, wherein in the ommatidium columns, the optical elements in various ommatidia are all microlenses, diameters and focal lengths of which are at least partially same.

10. The compound eye camera device according to claim 9, wherein in the ommatidium columns, cross section of the microlens of each of the ommatidia perpendicular to the ommatidium-column visual plane is selected from the group consisting of a circle, an ellipses and a polygon.

11. The compound eye camera device according to claim 1, wherein in a single ommatidium column, number of the photosensitive units in each of the ommatidia is same.

12. The compound eye camera device according to claim 1, wherein information received by the photosensitive unit comprises intensity information and color information of an incident light beam on corresponding sight line.

13. The compound eye camera device according to claim 1, wherein various ommatidia in the ommatidium columns are integrated on a same semiconductor substrate, and various ommatidia are separated from each other by a medium.

14. A compound eye camera device, comprising:
ommatidium columns, each of which comprises a plurality of ommatidia that do not interfere with each other optically and are arranged in a column, and each of the ommatidia comprises an optical element and at least one photosensitive unit arranged near a focal plane of the optical element, wherein the optical element is used to face a photographed object and receive incident light beams within view, wherein each of the ommatidium columns corresponds to at least one ommatidium-column visual plane, the at least one ommatidium-column visual plane passing through an optical center of each ommatidium in the ommatidium columns and a position near centers of at least one photosensitive unit of each ommatidium, wherein each photosensitive unit intersects at least one ommatidium-column visual plane, and sight line of each photosensitive unit passes through a center of the photosensitive unit and an optical center of the ommatidium where it is located;
a processor, which is configured to generate images based on information received by the photosensitive units in the ommatidia, and to process images to obtain information about the photographed object, wherein a single ommatidium column comprises at least one sub-ommatidium column, each sub-ommatidium column comprises a plurality of ommatidia adjacent to each other in sequence, and a set spacing is provided between two adjacent sub-ommatidium columns, wherein a single ommatidium column comprises at least one sub-ommatidium column, each sub-ommatidium column comprises a plurality of ommatidia adjacent to each other in sequence, and a set spacing is provided between two adjacent sub-ommatidium columns.

15. The compound eye camera device according to claim 14, wherein an ommatidium is provided between two adjacent sub-ommatidium columns, which does not belong to a same ommatidium column as the sub-ommatidium columns.

16. The compound eye camera device according to claim 14, wherein a line connecting optical centers of ommatidia in each sub-ommatidium column is selected from the group consisting of a straight line segment and an arc line segment.

17. The compound eye camera device according to claim 16, wherein the sight line of each photosensitive unit has a diffusion angle associated with a photosensitive area of the photosensitive unit, and the diffusion angle is not more than an angle between the sight lines of two adjacent photosensitive units in a same ommatidium-column visual plane.

18. The compound eye camera device according to claim 17, wherein when a line connecting the optical centers of each ommatidium in the sub-ommatidium column is an arc line segment, the diffusion angle is also not more than an angle between axes of two adjacent ommatidia located in an arc line segment.

19. A compound eye system comprising:
a plurality of compound eye camera devices, each comprising:
ommatidium columns, each of which comprises a plurality of ommatidia that do not interfere with each other optically and are arranged in a column, and each of the ommatidia comprises an optical element and at least one photosensitive unit arranged near a focal plane of the optical element, wherein the optical element is used to face a photographed object and receive incident light beams within view, wherein each of the ommatidium columns corresponds to at least one ommatidium-column visual plane, the at least one ommatidium-column visual plane passing through an optical center of each ommatidium in the ommatidium columns and a position near centers of at least one photosensitive unit of each ommatidium, wherein each photosensitive unit intersects at least one ommatidium-column visual plane, and sight line of each photosensitive unit passes through a center of the photosensitive unit and an optical center of the ommatidium where it is located, and
a processor, which is configured to generate images based on information received by the photosensitive units in the ommatidia, and to process images to obtain information about the photographed object; and
a control device for controlling poses of ommatidium columns in the compound eye camera device, which is connected with a processor of each of the compound eye camera devices.

20. The compound eye system according to claim 19 wherein a plurality of the compound eye camera devices are symmetrical relative to a center line.

* * * * *